United States Patent
Nakagawa et al.

(10) Patent No.: US 7,906,030 B2
(45) Date of Patent: Mar. 15, 2011

(54) DRY ETCHING METHOD, FINE STRUCTURE FORMATION METHOD, MOLD AND MOLD FABRICATION METHOD

(75) Inventors: Hideo Nakagawa, Shiga (JP); Masaru Sasago, Osaka (JP); Tomoyasu Murakami, Osaka (JP)

(73) Assignee: Panasonic Corporation, Osaka (JP)

( * ) Notice: Subject to any disclaimer, the term of this patent is extended or adjusted under 35 U.S.C. 154(b) by 786 days.

(21) Appl. No.: 11/659,107

(22) PCT Filed: May 23, 2006

(86) PCT No.: PCT/JP2006/310215
§ 371 (c)(1),
(2), (4) Date: Feb. 1, 2007

(87) PCT Pub. No.: WO2007/094087
PCT Pub. Date: Aug. 23, 2007

(65) Prior Publication Data
US 2009/0017259 A1 Jan. 15, 2009

(30) Foreign Application Priority Data
Feb. 13, 2006 (JP) ................................ 2006-034853

(51) Int. Cl.
*C25F 3/00* (2006.01)
*C03C 25/68* (2006.01)
*H01L 21/461* (2006.01)

(52) U.S. Cl. .............................. 216/11; 216/58; 438/706

(58) Field of Classification Search ................... 438/710; 216/58
See application file for complete search history.

(56) References Cited

U.S. PATENT DOCUMENTS

| 5,164,330 | A | | 11/1992 | Davis et al. |
| 5,298,112 | A | * | 3/1994 | Hayasaka et al. ............... 216/67 |
| 5,772,905 | A | | 6/1998 | Chou |
| 5,814,238 | A | | 9/1998 | Ashby et al. |
| 6,015,976 | A | * | 1/2000 | Hatakeyama et al. ... 250/492.23 |
| 6,156,243 | A | | 12/2000 | Kosuga et al. |
| 6,168,737 | B1 | * | 1/2001 | Poco et al. .................... 264/129 |
| 6,420,095 | B1 | * | 7/2002 | Kawamura et al. .......... 430/313 |
| 2002/0142230 | A1 | | 10/2002 | Yan et al. |
| 2003/0024902 | A1 | * | 2/2003 | Li et al. .......................... 216/67 |
| 2004/0224504 | A1 | | 11/2004 | Gadgil |
| 2005/0112901 | A1 | * | 5/2005 | Ji et al. .......................... 438/710 |

FOREIGN PATENT DOCUMENTS

| JP | 1-98229 | 4/1989 |
| JP | 6-29253 | 2/1994 |
| JP | 7-263426 | 10/1995 |

(Continued)

OTHER PUBLICATIONS

Chou, et al., "Imprint of sub-25 nm vias and trenches in polymers," Appl. Phys. Lett., Nov. 20, 1995, pp. 3114-3116, vol. 67, No. 21, American Institute of Physics.

United States Supplemental Final Office Action issued in U.S. Appl. No. 11/475,173 dated Jan. 7, 2010.

(Continued)

*Primary Examiner* — Nadine G Norton
*Assistant Examiner* — Patti Lin
(74) *Attorney, Agent, or Firm* — McDermott Will & Emery LLP

(57) ABSTRACT

A WC substrate 7 is etched by using plasma 50 generated from a mixed gas of a gas including a halogen atom and a gas including a nitrogen atom.

18 Claims, 10 Drawing Sheets

FOREIGN PATENT DOCUMENTS

| | | |
|---|---|---|
| JP | 10-337734 | 12/1998 |
| JP | 3152831 | 1/2001 |
| JP | 2002-151468 | 5/2002 |
| JP | 2003-17475 | 1/2003 |
| JP | 2004-39777 | 2/2004 |
| JP | 2005-302840 | 10/2005 |

OTHER PUBLICATIONS

United States Office Action issued in U.S. Appl. No. 11/475,173 dated Nov. 27, 2009.

United States Office Action issued in U.S. Appl. No. 11/659,109, mailed Jun. 18, 2010.

* cited by examiner

DRY ETCHING METHOD, FINE STRUCTURE FORMATION METHOD, MOLD AND MOLD FABRICATION METHOD

RELATED APPLICATIONS

This application is the U.S. National Phase under 35 U.S.C. §371 of International Application No. PCT/JP2006/310215, filed on May 23, 2006, which in turn claims the benefit of Japanese Application No. 2006-034853, filed on Feb. 13, 2006, the disclosures of which applications are incorporated by reference herein.

TECHNICAL FIELD

The present invention relates to a microprocessing technique for a substance including tungsten (W) and carbon (C), a mold including, as composing elements, a substance including tungsten (W) and carbon (C) and a method for fabricating the mold.

BACKGROUND ART

Recently, in accordance with the spread of internet, there are increasing demands for an optical communication system as high bit rate communication infrastructure. In order to introduce the high bit rate communication system into general homes and make it more popular, a technique to realize a low cost of an optical circuit component included in the optical communication system is necessary.

An optical waveguide, that is, a principal composing element of the optical circuit component, can be generally fabricated by forming a desired groove pattern on a glass substrate by a lithography technique and a dry etching technique typified by semiconductor process. Since an expensive fabrication apparatus is necessary in this method, however, it is disadvantageously difficult to reduce the cost of the optical waveguide. Therefore, as described in Patent Document 1, attention is now being paid to a method for forming a desired optical waveguide or the like on a glass by pressing a mold having a desired concavo-convex structure against the surface of a softened material of glass. In this method, a desired optical waveguide can be mass produced when a mold is prepared, and hence, the optical circuit component can be inexpensively provided. However, since this method should be performed at a high temperature and a high pressure, the mold needs to have heat resistance, rigidity and durability. A material satisfying this necessity is a WC alloy including tungsten (W) and carbon (C), that is, hard metals, as principal components.

A method for forming a fine pattern on the surface of a WC alloy is a metal machining method using a diamond cutting tool disclosed in Patent Document 1, but the dimension of a concavo-convex pattern cut on a mold by this machining method is several microns or more and this machining method is also restricted in processing uniformity. As a method for realizing processing of a concavo-convex pattern not only in the dimension range realized by the metal machining method using a diamond cutting tool but also with a concavo-convex dimension of 1 µm or less, a microprocessing technique employing the lithography technique and the dry etching technique is effective. With this technique, not only a fine concavo-convex pattern can be formed but also processing variation is small and a mold can be fabricated at a lower cost than in the metal machining method using a diamond cutting tool.

As a dry etching technique for a WC alloy, Patent Document 2 discloses that the WC alloy can be dry etched by using $CF_4$ or $SF_6$.

Now, the conventional dry etching method will be described with reference to FIGS. 9(a) and 9(b). As shown in FIG. 9(a), a reaction chamber 101 in which a reduced pressure can be kept is provided with a gas inlet 102 and a gas outlet 103. Also, a plasma generator 104 for changing a gas supplied through the gas inlet 102 into plasma is provided in an upper portion of the reaction chamber 101. Furthermore, an electrode 106 on which a target material, specifically, a WC alloy substrate or a substrate having a WC alloy in its surface portion (hereinafter both referred to as a WC substrate 107), is placed is provided on an insulator 105 in a lower portion of the reaction chamber 101. An RF (radio frequency) power source 108 for applying a bias voltage to the electrode 106 is provided outside the reaction chamber 101.

Next, the operation of the etching system shown in FIG. 9(a) will be described by exemplifying the case where $CF_4$ is used as an etching gas. As shown in FIG. 9(a), $CF_4$ is introduced through the gas inlet 102 into the reaction chamber 101, and plasma 150 of the $CF_4$ is generated by the plasma generator 104 and at the same time, RF bias is applied to the WC substrate 107 by the RF power source 108. As a result, radicals 109 of C, F or $CF_n$ (wherein n=1 though 4) and their ions 110 are produced in the plasma 150. At this point, in the plasma 150 used for the dry etching, the proportions in the number of atoms or molecules produced by the plasma 150 are generally in the order of $F > CF_n >> C$. The radicals 109 are isotropically diffused to reach the WC substrate 107, but the ions 110 are accelerated between the plasma 150 and the WC substrate 107 and hence enter the WC substrate 107 substantially vertically. In particular, in the case where a $F^+$ ion or a $CF^{n+}$ ion including a F atom enters the WC substrate 107, a bond between W and C is cut and W is released in the form of $WF_x$ (wherein x=1 through 6). On the other hand, C is re-released in the form of $CF_y$ (wherein y=1 through 4).

The etching reaction caused on the surface of the WC substrate will now be described in more detail with reference to FIG. 9(b). As shown in FIG. 9(b), a resist pattern 112 is formed on a WC substrate 111. When the WC substrate 111 is etched with ions 113a and 113b of $F^+$ or $CF^+$ by using the resist pattern 112 as a mask, the W included in the WC substrate 111 is released in the form of $WF_x$ (wherein x=1 through 6) 114. At this point, the side face of a pattern of the WC substrate 111 obtained through the etching is in a bowing shape for the following reason:

In the etching of the WC substrate 111, most ions enter the WC substrate 111 substantially vertically like the ion 113a, but since ions basically have energy spread (an ion energy angular distribution), some ions enter the WC substrate 111 obliquely like the ion 113b. Accordingly, the anisotropic (vertical) etching of the WC substrate 111 by using the resist pattern 112 as the etching mask is realized by the ion 113a vertically entering the WC substrate 111. However, due to the impact caused by the ion 113b obliquely entering the WC substrate 111, the side face of the pattern of the WC substrate 111 is etched, resulting in the bowing shape as shown in FIG. 9(b).

Next, a conventional fine structure formation method for a WC alloy and a mold fabrication method by employing the same will be described with reference to FIGS. 10(a) through 10(d).

As shown in FIG. 10(a), a WC alloy substrate 121 is prepared, and a resist pattern 122 is formed on the WC alloy substrate 121 as shown in FIG. 10(b). The resist pattern 122 is generally formed by the lithography technique. Next, as shown in FIG. 10(c), a pattern is transferred onto the WC alloy substrate 121 by using the resist pattern 122 as a mask. At this point, the pattern transfer is performed by the dry etching technique.

When the aforementioned conventional dry etching technique is employed, since ions 123 entering the WC alloy substrate 121 from plasma have the energy spread, there are not only a component A vertically entering the surface of the WC alloy substrate 121 but also components obliquely entering the surface at an angle, namely, obliquely entering components B and C. Therefore, since the side face of a pattern of the WC alloy substrate 121 is etched by such obliquely entering ions, the etched cross-section is in what is called a bowing shape as shown in FIG. 10(c).

Then, the resist pattern 122 is removed through ashing, and the resultant substrate is cleaned. Thus, a mold made of the WC alloy substrate 121 having a fine concavo-convex structure in its surface and inside portions is obtained as shown in FIG. 10(d).

A conventional processing technique by using a mold is a nano-imprint method such as nano-imprint lithography proposed by S. Y. Chou et al. (see, for example, Patent Document 3 and Non-patent Document 1). In the nano-imprint method, a mold is pressed against a resist thin film formed on a semiconductor wafer for forming a fine resist pattern, and this method is currently under development for forming a fine pattern of a nano order as the minimum dimension. In a fine structure portion of a conventional mold for use in the nano-imprint method, a $SiO_2$ film or a $Si_3N_4$ film that can be easily processed is used.

Patent Document 1: Japanese Patent No. 3152831
Patent Document 2: Japanese Laid-Open Patent Publication No. H1-98229
Patent Document 3: U.S. Pat. No. 5,772,905
Non-patent Document 1: Stephen Y. Chou, et al., Appl. Phys. Lett., Vol. 67, 1995, pp. 3114-3116

DISCLOSURE OF INVENTION

Problems to be Solved by the Invention

In the conventional dry etching method using $CF_4$ or $SF_6$, however, not only the bottom of a pattern but also the side face of the pattern is etched so that the side face is formed in a bowing shape as described above, and hence, a vertical etching shape cannot be attained and high performance processing cannot be performed. Furthermore, the processing by the conventional dry etching method has a problem that a highly precise fine structure cannot be formed on and inside a WC alloy. As a result, there is a serious problem that a WC alloy mold with a highly precise fine structure cannot be fabricated. In consideration of the aforementioned conventional disadvantage and problem, an object of the invention is providing a dry etching method for a WC alloy that can realize a vertical etching shape by preventing the side face of a pattern from being etched. Another object of the invention is providing a fine structure formation method for forming a highly precise fine structure in a vertical shape on and inside a WC alloy. Still another object of the invention is providing a WC alloy mold with a highly precise fine structure and a method for fabricating the same.

Means for Solving the Problems

In order to achieve the objects, a dry etching method according to this invention includes the step of etching a substance including tungsten and carbon by using plasma generated from a mixed gas of a gas including a halogen atom and a gas including a nitrogen atom.

In the dry etching method of this invention, it is possible to perform etching processing for realizing, on and within the substance including tungsten and carbon, a highly precise vertical shape or a highly precise downward tapered shape free from a bowing shape. Examples of the substance including tungsten and carbon are a WC alloy and a substance including W and C as principal components (in which the total content of W and C is 50 atomic % or more).

In the dry etching method of the invention, the mixed gas may be replaced with a gas including a halogen atom and a nitrogen atom (for example, $NF_3$, $N_2F$, $NCl_3$, $NBr_3$, $NI_3$, or the like).

In the dry etching method of the invention, if the gas including a halogen atom is a gas including a chlorine atom, the aforementioned effect can be attained definitely. In this case, preferably, the gas including a chlorine atom includes a chlorine molecule, a hydrogen chloride molecule, a boron trichloride molecule, or a mixture of two or more thereof. With this method, handling of gas supply and the like can be facilitated because these molecules are relatively small in weight, and concurrently chlorine can be produced efficiently through plasma discharge.

In the dry etching method of the invention, if the gas including a halogen atom is a gas including a fluorine atom, the aforementioned effect can be attained definitely. In this case, preferably, the gas including a fluorine atom includes a fluorine molecule, fluorocarbon, fluorohydrocarbon, or a mixture of two or more thereof. With this method, fluorine used for W etching can be efficiently supplied.

Preferably, in the dry etching method of the invention, the gas including a nitrogen atom includes a nitrogen molecule, an ammonia molecule, or a mixture thereof. With this method, nitrogen atoms can be produced efficiently through plasma discharge.

Preferably, in the dry etching method of the invention, a gas including a hydrogen atom is further mixed into the mixed gas. With this method, hydrogen atoms in addition to nitrogen atoms are supplied to increase the effect of removing carbon in the substance including tungsten and carbon. Therefore, the etching rate can be increased. In this case, preferably, the gas including a hydrogen atom includes a hydrogen molecule. With this method, handling of gas supply and the like can be facilitated to enhance the practical use, and concurrently hydrogen atoms can be supplied efficiently.

Preferably, in the dry etching method of the invention, a gas including an oxygen atom is further mixed into the mixed gas. With this method, the effect of adding oxygen can increase the etching rate of the substance including tungsten and carbon. Instead of mixing of the gas including an oxygen atom, a gas including a halogen atom and an oxygen atom (a nitrogen atom may be additionally included), such as $COCl_2$, $ClFO_3$, $NOCl$, $NO_2Cl$, $SOCl_2$, $SO_2Cl_2$, or $SO_3HCl$, may be used.

Preferably, in the dry etching method of the invention, an inert gas is further mixed into the mixed gas. With this method, the plasma discharge can be further stabilized by an inert gas effect, and hence, what is called a process window (i.e., an applicable range of process conditions) can be easily increased.

In the dry etching method of the invention, the gas including a halogen atom may include either of a gas including a bromine atom and a gas including an iodine atom, or a mixture of two or more of a gas including a chlorine atom, a gas including a fluorine atom, a gas including a bromine atom, and a gas including an iodine atom. Particularly, in the case where a gas including a bromine atom or a gas including an iodine atom is mixed as the gas including a halogen atom, the effect of protecting the side face of a portion to be etched can be enhanced which results from the effect of bromine or iodine, so that not only an etching for forming a vertical shape but also an etching for forming a downward tapered shape can be realized easily. The gas including a halogen atom may be a gas including two or more types of halogen atoms selected from a chlorine atom, a fluorine atom, a bromine atom, and an iodine atom, such as $ClF_3$, $CClF_3$, $CCl_3F$, $CCl_2F_2$, ICl, $ClF_2Br$, $ClF_2I$, or BrCl.

A fine structure formation method according to the invention includes the steps of: forming a mask pattern on a substance including tungsten and carbon; and dry etching, with the mask pattern used, the substance by using plasma generated from a mixed gas of a gas including a halogen atom and a gas including a nitrogen atom.

With the fine structure formation method of the invention, it is possible to rapidly perform processing for realizing, on and within the substance including tungsten and carbon, a highly precise vertical shape or a highly precise downward tapered shape free from a bowing shape.

In the fine structure formation method of the invention, the mixed gas may be replaced with a gas including a halogen atom and a nitrogen atom (for example, $NF_3$, $N_2F$, $NCl_3$, $NBr_3$, $NI_3$, or the like).

In the fine structure formation method of the invention, if the gas including a halogen atom is a gas including a chlorine atom, the aforementioned effect can be attained definitely. In this case, preferably, the gas including a chlorine atom includes a chlorine molecule, a hydrogen chloride molecule, a boron trichloride molecule, or a mixture of two or more thereof. With this method, handling of gas supply and the like can be facilitated because these molecules are relatively small in weight, and concurrently chlorine can be produced efficiently through plasma discharge. Accordingly, the substance including tungsten and carbon can be subjected to a more inexpensive processing for forming a highly precise vertical shape.

In the fine structure formation method of the invention, if the gas including a halogen atom is a gas including a fluorine atom, the aforementioned effect can be attained definitely. In this case, preferably, the gas including a fluorine atom includes a fluorine molecule, fluorocarbon, fluorohydrocarbon, or a mixture of two or more thereof. With this method, fluorine used for W etching can be efficiently supplied, so that a fine structure formation processing can be performed rapidly.

Preferably, in the fine structure formation method of the invention, the gas including a nitrogen atom includes a nitrogen molecule, an ammonia molecule, or a mixture thereof. With this method, handling of gas supply and the like can be facilitated because these molecules are relatively small in weight, and concurrently nitrogen can be produced efficiently through plasma discharge. Accordingly, the substance including tungsten and carbon can be subjected to a more inexpensive processing for forming a highly precise vertical shape.

Preferably, in the fine structure formation method of the invention, a gas including a hydrogen atom is further mixed into the mixed gas. With this method, hydrogen atoms in addition to nitrogen atoms are supplied to increase the effect of removing carbon in the substance including tungsten and carbon, so that the etching rate can be increased. Therefore, the substance including tungsten and carbon can be subjected to a more rapid processing for forming a highly precise vertical shape. In this case, preferably, the gas including a hydrogen atom includes a hydrogen molecule. With this method, handling of gas supply and the like can be facilitated to enhance the practical use, and concurrently hydrogen atoms can be supplied efficiently. Therefore, the substance including tungsten and carbon can be subjected to a more rapid, inexpensive processing for forming a highly precise vertical shape. In particular, if the gas including a hydrogen atom includes a hydrocarbon molecule, a processing for forming a downward tapered shape can be performed.

Preferably, in the fine structure formation method of the invention, a gas including an oxygen atom is further mixed into the mixed gas. With this method, the effect of adding oxygen can increase the etching rate, so that the substance including tungsten and carbon can be subjected to a rapid processing for forming a highly precise vertical shape. In this case, preferably, the gas including an oxygen atom includes an oxygen molecule, a nitrogen oxide molecule, a sulfur oxide molecule, a carbon oxide molecule, or a mixture of two or more of them. With this method, oxygen can be supplied efficiently, so that the substance including tungsten and carbon can be subjected to a stable, rapid processing for forming a highly precise vertical shape. Instead of mixing of the gas including an oxygen atom, a gas including a halogen atom and an oxygen atom (a nitrogen atom may be additionally included), such as $COCl_2$, $ClFO_3$, NOCl, $NO_2Cl$, $SOCl_2$, $SO_2Cl_2$, or $SO_3HCl$, may be used.

Preferably, in the fine structure formation method of the invention, an inert gas is further mixed into the mixed gas. With this method, the plasma discharge can be further stabilized by an inert gas effect, and hence, what is called a process window can be easily increased. Therefore, the substance including tungsten and carbon can be subjected to a more stable processing for forming a highly precise vertical shape.

In the fine structure formation method of the invention, the gas including a halogen atom may include either of a gas including a bromine atom and a gas including an iodine atom, or a mixture of two or more of a gas including a chlorine atom, a gas including a fluorine atom, a gas including a bromine atom, and a gas including an iodine atom. Particularly, in the case where a gas including a bromine atom or a gas including an iodine atom is mixed as the gas including a halogen atom, the effect of protecting the side face of a portion to be etched can be enhanced which results from the effect of bromine or iodine, so that in the fine structure formation processing, not only a processing for forming a highly precise vertical shape but also a processing for forming a highly precise downward tapered shape can be realized easily. The gas including a halogen atom may be a gas including two or more types of halogen atoms selected from a chlorine atom, a fluorine atom, a bromine atom, and an iodine atom, such as $ClF_3$, $CClF_3$, $CCl_3F$, $CCl_2F_2$, ICl, $ClF_2Br$, $ClF_2I$, or BrCl.

A mold fabrication method according to the invention includes the step of processing, by using plasma generated from a mixed gas of a gas including a halogen atom and a gas including a nitrogen atom, a substance including tungsten and carbon to fabricate a mold.

In the mold fabrication method of the invention, since the mold fabrication method employs the dry etching method of the invention, a mold made of a substance including tungsten and carbon and having a fine concavo-convex pattern with a vertical or downward tapered cross-section can be fabricated rapidly.

In the mold fabrication method of the invention, the mixed gas may be replaced with a gas including a halogen atom and a nitrogen atom (for example, $NF_3$, $N_2F$, $NCl_3$, $NBr_3$, $NI_3$, or the like).

In the mold fabrication method of the invention, if the gas including a halogen atom is a gas including a chlorine atom, the aforementioned effect can be attained definitely. In this case, preferably, the gas including a chlorine atom includes a chlorine molecule, a hydrogen chloride molecule, a boron trichloride molecule, or a mixture of two or more thereof. With this method, handling of gas supply and the like can be facilitated because these molecules are relatively small in weight, and concurrently chlorine can be produced efficiently through plasma discharge. Accordingly, a mold having a fine concavo-convex pattern with a side face in a highly precise vertical shape can be fabricated more inexpensively.

In the mold fabrication method of the invention, if the gas including a halogen atom is a gas including a fluorine atom, the aforementioned effect can be attained definitely. In this case, preferably, the gas including a fluorine atom includes a fluorine molecule, fluorocarbon, fluorohydrocarbon, or a mixture of two or more thereof. With this method, fluorine used for W etching can be efficiently supplied, so that a mold having a fine concavo-convex pattern with a vertical cross-section or a downward tapered cross-section can be fabricated rapidly and inexpensively.

Preferably, in the mold fabrication method of the invention, the gas including a nitrogen atom includes a nitrogen molecule, an ammonia molecule, or a mixture thereof. With this method, handling of gas supply and the like can be facilitated because these molecules are relatively small in weight, and concurrently nitrogen atoms can be produced efficiently through plasma discharge. Therefore, a mold having a fine concavo-convex pattern with a side face in a highly precise vertical shape or in a highly precise downward tapered shape can be fabricated more rapidly and more inexpensively.

Preferably, in the mold fabrication method of the invention, a gas including a hydrogen atom is further mixed into the mixed gas. With this method, hydrogen atoms in addition to nitrogen atoms are supplied to increase the effect of removing carbon in the substance including tungsten and carbon, so that the etching rate can be increased. Therefore, a mold having a fine concavo-convex pattern with a side face in a highly precise vertical shape or in a highly precise downward tapered shape can be fabricated more rapidly and more inexpensively. In this case, preferably, the gas including a hydrogen atom includes a hydrogen molecule. With this method, handling of gas supply and the like can be facilitated to enhance the practical use, and concurrently hydrogen atoms can be supplied efficiently. Therefore, a mold having a fine concavo-convex pattern with a side face in a highly precise vertical shape or in a highly precise downward tapered shape can be fabricated more rapidly and more inexpensively.

Preferably, in the mold fabrication method of the invention, a gas including an oxygen atom is further mixed into the mixed gas. With this method, the effect of adding oxygen increases the etching rate of the substance including W and C, so that a mold having a fine concavo-convex pattern with a side face in a highly precise vertical shape or in a highly precise downward tapered shape can be fabricated rapidly and inexpensively. Instead of mixing of the gas including an oxygen atom, a gas including a halogen atom and an oxygen atom (a nitrogen atom may be additionally included), such as $COCl_2$, $ClFO_3$, $NOCl$, $NO_2Cl$, $SOCl_2$, $SO_2Cl_2$, or $SO_3HCl$, may be used.

Preferably, in the mold fabrication method of the invention, an inert gas is further mixed into the mixed gas. With this method, the plasma discharge can be further stabilized by an inert gas effect, and hence, what is called a process window can be easily increased. Therefore, a mold having a fine concavo-convex pattern with a side face in a highly precise vertical shape or in a highly precise downward tapered shape can be fabricated more stably.

In the mold fabrication method of the invention, the gas including a halogen atom may include either of a gas including a bromine atom and a gas including an iodine atom, or a mixture of two or more of a gas including a chlorine atom, a gas including a fluorine atom, a gas including a bromine atom, and a gas including an iodine atom. Particularly, in the case where a gas including a bromine atom or a gas including an iodine atom is mixed as the gas including a halogen atom, the effect of protecting the side face of a portion to be etched can be enhanced which results from the effect of bromine or iodine, so that not only a mold having a fine concavo-convex pattern with a side face in a highly precise vertical shape, but also a mold having a fine concavo-convex pattern with a side face in a highly precise downward tapered shape can be fabricated easily, rapidly, and inexpensively. The gas including a halogen atom may be a gas including two or more types of halogen atoms selected from a chlorine atom, a fluorine atom, a bromine atom, and an iodine atom, such as $ClF_3$, $CClF_3$, $CCl_3F$, $CCl_2F_2$, $ICl$, $ClF_2Br$, $ClF_2I$, or $BrCl$.

A mold according to the invention is fabricated by processing a substance including tungsten and carbon by using plasma generated from a mixed gas of a gas including a halogen atom and a gas including a nitrogen atom.

In the mold of the invention, since the mold is fabricated by employing the dry etching method of the invention, a mold made of a substance including tungsten and carbon and having a fine concavo-convex pattern with a vertical or downward tapered cross-section can be provided rapidly.

In the mold of the invention, the mixed gas may be replaced with a gas including a halogen atom and a nitrogen atom (for example, $NF_3$, $N_2F$, $NCl_3$, $NBr_3$, $NI_3$, or the like).

In the mold of the invention, if the gas including a halogen atom is a gas including a chlorine atom, the aforementioned effect can be attained definitely. In this case, preferably, the gas including a chlorine atom includes a chlorine molecule, a hydrogen chloride molecule, a boron trichloride molecule, or a mixture of two or more thereof. With this method, handling of gas supply and the like can be facilitated because these molecules are relatively small in weight, and concurrently chlorine can be produced efficiently through plasma discharge. Accordingly, a mold having a fine concavo-convex pattern with a side face in a highly precise vertical shape can be provided more rapidly and inexpensively.

In the mold of the invention, if the gas including a halogen atom is a gas including a fluorine atom, the aforementioned effect can be attained definitely. In this case, preferably, the gas including a fluorine atom includes a fluorine molecule, fluorocarbon, fluorohydrocarbon, or a mixture of two or more thereof. With this method, fluorine used for W etching can be efficiently supplied, so that a mold having a fine concavo-convex pattern with a vertical cross-section or a downward tapered cross-section can be provided rapidly and inexpensively.

Preferably, in the mold of the invention, the gas including a nitrogen atom includes a nitrogen molecule, an ammonia molecule, or a mixture thereof. With this method, handling of gas supply and the like can be facilitated because these molecules are relatively small in weight, and concurrently nitrogen can be produced efficiently through plasma discharge. Therefore, a mold having a fine concavo-convex pattern with a side face in a highly precise vertical shape or in a highly precise downward tapered shape can be provided more rapidly and more inexpensively.

Preferably, in the mold of the invention, a gas including a hydrogen atom is further mixed into the mixed gas. With this method, hydrogen atoms in addition to nitrogen atoms are supplied to increase the effect of removing carbon in the substance including tungsten and carbon, so that the etching rate can be increased. Therefore, a mold having a fine concavo-convex pattern with a side face in a highly precise vertical shape or in a highly precise downward tapered shape can be provided rapidly and more inexpensively. In this case, preferably, the gas including a hydrogen atom includes a hydrogen molecule. With this method, handling of gas supply and the like can be facilitated to enhance the practical use, and concurrently hydrogen atoms can be supplied efficiently. Therefore, a mold having a fine concavo-convex pattern with a side face in a highly precise vertical shape or in a highly precise downward tapered shape can be provided more rapidly and more inexpensively.

Preferably, in the mold of the invention, a gas including an oxygen atom is further mixed into the mixed gas. With this method, the effect of adding oxygen increases the etching rate of the substance including W and C, so that a mold having a fine concavo-convex pattern with a side face in a highly precise vertical shape or in a highly precise downward tapered shape can be provided rapidly and inexpensively. Instead of mixing of the gas including an oxygen atom, a gas including a halogen atom and an oxygen atom (a nitrogen atom may be additionally included), such as $COCl_2$, $ClFO_3$, $NOCl$, $NO_2Cl$, $SOCl_2$, $SO_2Cl_2$, or $SO_3HCl$, may be used.

Preferably, in the mold of the invention, an inert gas is further mixed into the mixed gas. With this method, the plasma discharge can be further stabilized by an inert gas effect, and hence, what is called a process window can be easily increased. Therefore, a mold having a fine concavo-convex pattern with a side face in a highly precise vertical shape or in a highly precise downward tapered shape can be provided more stably.

In the mold of the invention, the gas including a halogen atom may include either of a gas including a bromine atom and a gas including an iodine atom, or a mixture of two or more of a gas including a chlorine atom, a gas including a fluorine atom, a gas including a bromine atom, and a gas including an iodine atom. Particularly, in the case where a gas including a bromine atom or a gas including an iodine atom is mixed as the gas including a halogen atom, the effect of protecting the side face of a portion to be etched can be enhanced which results from the effect of bromine or iodine, so that not only a mold having a fine concavo-convex pattern with a side face in a highly precise vertical shape, but also a mold having a fine concavo-convex pattern with a side face in a highly precise downward tapered shape can be provided easily, rapidly, and inexpensively. The gas including a halogen atom may be a gas including two or more types of halogen atoms selected from a chlorine atom, a fluorine atom, a bromine atom, and an iodine atom, such as $ClF_3$, $CClF_3$, $CCl_3F$, $CCl_2F_2$, $ICl$, $ClF_2Br$, $ClF_2I$, or $BrCl$.

Since the mold of this invention is fabricated by the dry etching method of this invention, a nitrogen content is higher in a portion closer to a processed face of the substance including tungsten and carbon.

TECHNICAL ADVANTAGES

In the dry etching method according to the invention, etching is performed by using plasma generated from a mixed gas of a gas including a halogen atom (for example, a chlorine atom or a fluorine atom) and a gas including a nitrogen atom. Therefore, tungsten is removed through etching with halogen atoms (radicals) and ions of the halogen supplied from the plasma. Thus, $WF_x$ (x=1 through 6), $WCl_x$ (x=1 through 6) with a lower volatility than $WF_x$, or the like is produced from the surface subjected to the etching reaction, and some amount of the produced $WF_x$, $WCl_x$, or the like is adsorbed again onto the side face of a pattern of the WC alloy or the like being etched. As a result, a sidewall protecting film produced by this readsorption can block an etching reaction caused by the impact of an ion entering the side face of the pattern, so that a vertical etching shape in cross-section can be realized. On the other hand, since by nitrogen and nitrogen ions supplied from the plasma, carbon is efficiently removed in the form of CN or $C_2N_2$, the etching efficiency for the tungsten by halogen can be improved. As a result, a substance including tungsten and carbon can be rapidly etched into a vertical shape.

Furthermore, in the dry etching method according to the invention, a gas including a hydrogen atom is additionally mixed into a mixed gas of a gas including a halogen atom and a gas including a nitrogen atom. Thereby, carbon contained in a substance including tungsten and carbon can be removed not only in the form of CN or $C_2N_2$ but also in the form of HCN with high volatility. Therefore, a more rapid etching for forming a vertical shape can be performed.

Moreover, in the dry etching method according to the invention, if a gas including a bromine atom or a gas including an iodine atom is particularly used as a gas including a halogen atom, $WBr_x$ (x=1 through 6) or $WI_x$ (x=1 through 6) with a lower volatility than $WCl_x$ (x=1 through 6) is produced from the surface being etched. Thereby, a sidewall protecting film with a larger thickness can be formed. Accordingly, not only an etching for forming a vertical shape but also an etching for forming a downward tapered shape can be realized. Also in the case where a gas including a bromine atom, a gas including an iodine atom, or a mixture thereof is used without using a gas including a chlorine atom, the effect of removing carbon by nitrogen, and in addition the effect of removing carbon by hydrogen can realize an etching for forming a vertical shape and an etching for forming a downward tapered shape.

In the fine structure formation method according to the invention, a fine concavo-convex pattern with a vertical cross-section or a downward tapered cross-section can be formed on and within a substance including tungsten and carbon.

In the mold fabrication method according to the invention, a mold made of a substance including tungsten and carbon and having a fine concavo-convex pattern with a vertical cross-section or a downward tapered cross-section can be fabricated.

In the mold according to the invention, a mold made of a substance including tungsten and carbon and having a fine concavo-convex pattern with a vertical cross-section or a downward tapered cross-section can be realized.

In any of the dry etching method, the fine structure formation method, the mold fabrication method and the mold according to this invention, even when the substance including tungsten and carbon further includes nitrogen (N), the same effects as described above can be attained. In other words, when the invention is applied to a WCN alloy, a WNC alloy or the like, the same effects can be attained.

Figure 1A:
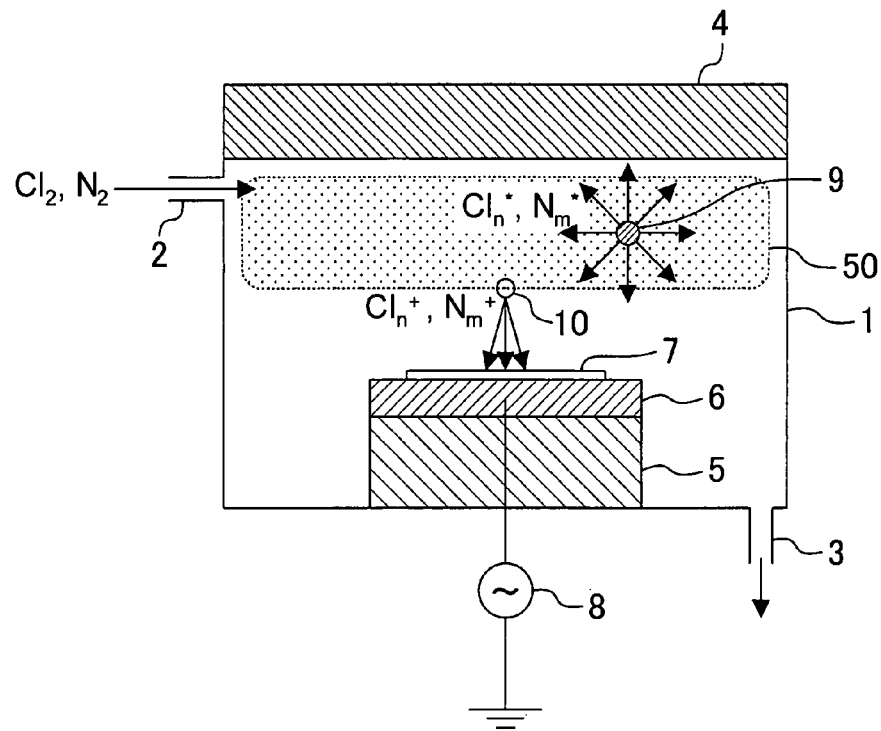
FIGS. 1(a) and 1(b) are explanatory diagrams of a dry etching method according to Embodiment 1 of the invention.

EXPLANATION OF REFERENCES 1 reaction chamber
2 gas inlet
3 gas outlet
4 plasma generator
5 insulator
6 electrode
7 WC substrate
8 RF power source
9 radical
10 ion
11 WC substrate
12 resist pattern
13a, 13b, 13c ion
14 sidewall protecting film
15 hydrogen ion
16a, 16b, 16c ion
21 WC alloy substrate
22 resist pattern
23 ion
24a, 24b sidewall protecting film
31 underlying substrate
31a substrate made of a metal or a conducting material
31b substrate made of an insulating material
31c substrate made of a semiconductor material
32 substance including tungsten and carbon
50, 55 plasma
61 reaction chamber
62 gas inlet
63 gas outlet
64 plasma generator
65 insulator
66 electrode
67 WC substrate
68 RF power source
69 radical
70 ion
71 WC substrate
72 resist pattern
73a, 73b, 73c ion
74 radical
75 ion
76 sidewall protecting film
81 WC alloy substrate
82 resist pattern
83 ion
84a, 84b sidewall protecting film
85 WCN layer
91 underlying substrate
91a substrate made of a metal or a conducting material
91b substrate made of an insulating material
91c substrate made of a semiconductor material
92 substance including tungsten and carbon

BEST MODE FOR CARRYING OUT THE INVENTION

Embodiment 1

A dry etching method according to Embodiment 1 of the invention will now be described with reference to the accompanying drawings.

Figure 1B:
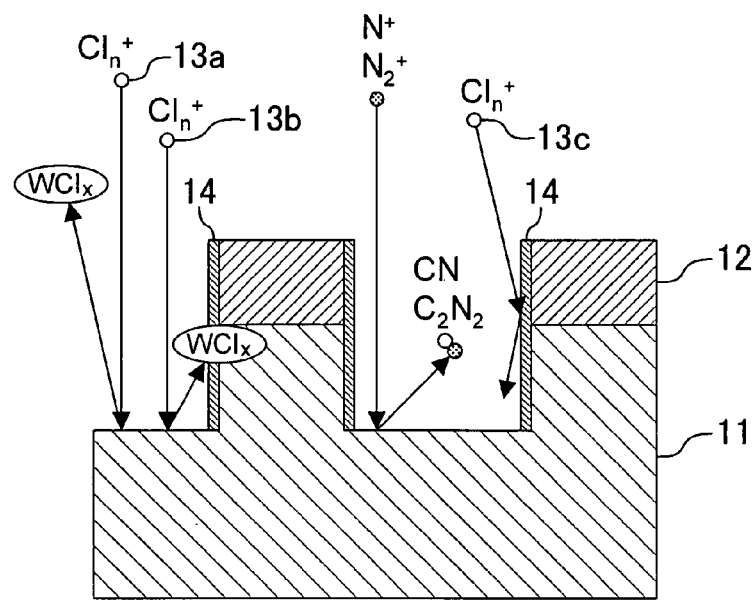

FIGS. 1(a) and 1(b) are explanatory diagrams of the dry etching method of Embodiment 1 of the invention. As shown in FIG. 1(a), a reaction chamber 1 in which a reduced pressure can be kept is provided with a gas inlet 2 and a gas outlet 3. Also, a plasma generator 4 for changing a gas supplied through the gas inlet 2 into plasma is provided in an upper portion of the reaction chamber 1. Furthermore, an electrode 6 on which a target substance including tungsten and carbon, specifically, a WC alloy substrate or a substrate having a WC alloy in its surface portion (hereinafter both referred to as a WC substrate 7), is placed is provided on an insulator 5 in a lower portion of the reaction chamber 1. An RF (radio frequency) power source 8 for applying a bias voltage to the electrode 6 is provided outside the reaction chamber 1.

Next, the operation of the etching system shown in FIG. 1(a), namely, the dry etching method of this embodiment, will be described by exemplifying the case where a chlorine gas and a nitrogen gas are used as an etching gas. As shown in FIG. 1(a), a $Cl_2$ gas and a $N_2$ gas are introduced through the gas inlet 2 into the reaction chamber 1, and plasma 50 of the introduced $Cl_2$ gas and $N_2$ gas is generated by the plasma generator 4 and at the same time, RF bias is applied to the WC substrate 7 by the RF power source 8. As a result, radicals 9 of chlorine radicals $Cl_n^*$ (n=1 and 2) and nitrogen radicals $N_m^*$ (m=1 and 2), and ions 10 of chlorine ions $Cl_n^+$ (n=1 and 2) and nitrogen ions $N_m^+$ (m=1 and 2) are produced in the plasma 50 with the $Cl_2$ gas and the $N_2$ gas mixed. It is noted that a mark "*" is herein used for expressing a radical including an excited atom.

The radicals 9 isotropically diffuse to reach the WC substrate 7, but the ions 10 are accelerated between the plasma 50 and the WC substrate 7 and hence enter the WC substrate 7 substantially vertically. At this point, chlorine ions $Cl_n^+$ of the ions 10 cut bonds between W and C by their kinetic energies to react with W, resulting in an release of $WCl_x$ (wherein x=1 through 6). On the other hand, C is removed partly in the form of $CCl_x$ (wherein x=1 through 4) and mainly in the form of CN or $C_2N_2$.

The etching reaction caused on the surface of the WC substrate will be described in more detail with reference to FIG. 1(b). FIG. 1(b) shows a state of the WC substrate being etched by the dry etching method of this embodiment. As shown in FIG. 1(b), after forming a resist pattern 12 on a WC substrate 11, the WC substrate 11 is etched with ions 13a, 13b and 13c composed of $Cl_n^+$ (wherein n=1 and 2) ions by using the resist pattern 12 as a mask, and W included in the WC substrate 11 is released in the form of $WCl_x$ (wherein x=1 through 6) which will form a sidewall protecting film 14. It is noted that although not shown in FIG. 1(b), chlorine radicals of the radicals 9 in FIG. 1(a) isotropically scatter from plasma. Also, it is conceivable that the chlorine radicals will be adsorbed physically or chemically onto part of the surface being etched (the bottom and side faces of the pattern of the WC substrate 11 and the top and side portions of the resist pattern 12), be reflected from the surface being etched to enter the gas phase again, or be once adsorbed physically onto the surface being etched and then re-released. In this etching, spontaneous chemical reaction by chlorine radicals adsorbed onto the surface being etched is considerably difficult to cause as compared with the case of employing fluorine.

On the other hand, out of the chlorine ions, the ion 13a substantially vertically entering the WC substrate 11 cuts a bond between W and C by its ion impact energy and is chemically bonded to W to produce a reaction product of $WCl_x$. At this point, the $WCl_x$ reacts with a plurality of incident chlorine ions a plurality of times to be ultimately released into the gas phase as a molecule of $WCl_5$, $WCl_6$, or the like. Furthermore, like the chlorine ion 13b, some ions chemically react with W on the surface subjected to the etching reaction, and a resultant reaction product $WCl_x$ is released into the gas phase to be adsorbed onto the side face of the pattern of the WC substrate 11 being etched and the side face of the resist pattern 12. In particular, this adsorption is likely to occur where X=1 through 4 in $WCl_x$. Since $WCl_x$ has a lower vapor pressure than $WF_x$, the probability of $WCl_x$ re-release after adsorption is low. Therefore, $WCl_x$ adsorbed onto the side face of the pattern of the WC substrate 11 is kept deposited on the side face to form the sidewall protecting film 14. This phenomenon is also conceivable easily from the fact that $WF_6$ has a boiling point of 17.5° C. (at atmospheric pressure) whereas $WCl_5$ and $WCl_6$ have boiling points of 275.6° C. and 346.7° C., respectively. The presence of this sidewall protecting film 14 prevents the chlorine ion 13c obliquely entering the WC substrate 11 from etching the side face of the pattern, so that the side face is not formed in the bowing shape caused in the conventional technique. Although some amount of C in the WC substrate 11 is removed through etching as a reaction product with chlorine in the form of $CCl_x$ (x=1 through 4), particularly in the form of $CCl_4$, a large amount of C is removed by nitrogen ions in the form of CN or $C_2N_2$.

As described so far, according to the dry etching method of this embodiment, etching for attaining a highly precise vertical shape free from a bowing shape can be performed on the surface and the inside of a WC alloy of a substance including tungsten and carbon as principal components.

In this embodiment, description has been made of the case where a chlorine molecule is used as the gas including a chlorine atom. Instead of the chlorine molecule, a hydrogen chloride molecule or a boron trichloride molecule may be used. Also, a mixture of two or all gases selected from a chlorine molecule, a hydrogen chloride molecule, and a boron trichloride molecule may be used instead. This enables easy handling of gas supply and the like because these molecules are relatively small in weight, and concurrently enables efficient chlorine production through plasma discharge. As a result, gas supply can be conducted at a low cost. Even though another gas including chlorine other than the aforementioned gases is used, the dry etching method of the invention is, of course, operable. However, in general, a larger molecule has a lower vapor pressure and may become in the form of a solid source. In this case, it is difficult to supply the molecule and the cost of using it increases.

Moreover, in this embodiment, a mixed gas of a gas including a chlorine atom and a gas including a nitrogen atom is used. Instead of the gas including a chlorine atom, a gas including another halogen atom may be used. Alternatively, instead of the mixed gas of a gas including a chlorine atom and a gas including a nitrogen atom, use may be made of a gas including a chlorine atom or another halogen atom and a nitrogen atom (for example, $NF_3$, $N_2F$, $NCl_3$, $NBr_3$, or $NI_3$).

Furthermore, in this embodiment, a nitrogen molecule is used as the gas including a nitrogen atom. Instead of this, use may be made of an ammonia molecule or a mixture of a nitrogen molecule and an ammonia molecule.

Moreover, in this embodiment, if a gas including an oxygen atom is mixed into the mixed gas of a gas including a chlorine atom and a gas including a nitrogen atom, the etching rate can be increased. The reason for this is as follows: C remaining after removal of W by a chlorine ion is removed in the form of $CCl_x$ (x=1 through 4) and CN or $C_2N_2$, and in addition to this, an oxygen radical and an oxygen ion provide the effect of removing the C in the form of $CO_2$ or CO. This effect is sufficiently provided even when the flow rate of the gas including oxygen is less than 10% of the total flow rate of the gas including chlorine and the gas including oxygen. Practically, it is sufficient that the flow rate of the gas including oxygen is set to a desired flow rate within a range of approximately 50% or less of the total gas flow rate. In addition, if an oxygen molecule, a nitrogen oxide molecule, a sulfur oxide molecule, a carbon oxide molecule, or a mixture of two or more of them is used as the gas including an oxygen atom, oxygen can be supplied efficiently. Instead of mixing of the gas including an oxygen atom, a gas including a chlorine atom and an oxygen atom (a nitrogen atom may be additionally included), such as $COCl_2$, $CiFO_3$, NOCl, $NO_2Cl$, $SOCl_2$, $SO_2Cl_2$, or $SO_3HCl$, may be used.

Furthermore, in this embodiment, if an inert gas is mixed into the mixed gas of a gas including a chlorine atom and a gas including a nitrogen atom, the plasma discharge can be further stabilized due to an inert gas effect, and hence, what is called a process window can be easily increased. Specifically, when an inert gas is mixed at a flow rate several times as large as the flow rate of the chlorine gas, the electron temperature within the plasma is regulated by the electron temperature of the inert gas, resulting in a stabilization of the plasma discharge. As the inert gas, for example, Ar may be used. Alternatively, when any of He, Ne, Ar, Kr, Xe and Rn is selectively used as the inert gas, the electron temperature within the plasma can be increased or reduced. In other words, the electron temperature of the plasma of an inert gas largely depends upon the first ionization energy of the inert gas. Therefore, when plasma with a higher electron temperature is desired to generate, an inert gas with a smaller atomic number can be used, and when plasma with a lower electron temperature is desired to generate, an inert gas with a larger atomic number can be used. At this point, two or more inert gases may be mixedly used.

Moreover, an etching system used in this embodiment may be any of a reactive ion etching (RIE) system of a parallel plate type or the like, a dual frequency parallel plate RIE system, a magnetron enhanced RIE (MERIE) system, an inductively coupled plasma (ICP) etching system, an electron cyclotron resonance (ECR) etching system, a UHF plasma etching system, and a neutral loop discharge (NLD) etching system. Also, the optimal etching conditions are different depending upon the method employed by the etching system, and the ranges of the etching conditions of this embodiment are, for example, a gas flow rate of several tens through several hundreds of cubic centimeters per minute (at room temperature), a pressure of 0.1 through 20 Pa, a high-frequency power for plasma generation of a hundred through several thousands of watts, and an RF bias voltage of a hundred through a thousand of watts.

Furthermore, although the WC substrate including tungsten and carbon as the principal components is etched in this embodiment, a metal, an insulating or a semiconductor substance having the substance including tungsten and carbon on its surface may be etched instead. Moreover, when the substance including tungsten and carbon further includes nitrogen, the same effects as those described in this embodiment can be attained. In other words, the same effects as those described in this embodiment can be attained also in etching a WCN alloy or a WNC alloy.

Embodiment 2

Now, a dry etching method according to Embodiment 2 of the invention will be described with reference to the accompanying drawings. A difference of the dry etching method of this embodiment from that of Embodiment 1 is that a substance including tungsten and carbon as principal compositions is dry etched by using plasma generated from a gas made by additionally adding a gas including a hydrogen atom to a mixed gas of a gas including a chlorine atom and a gas including a nitrogen atom.

Figure 2:
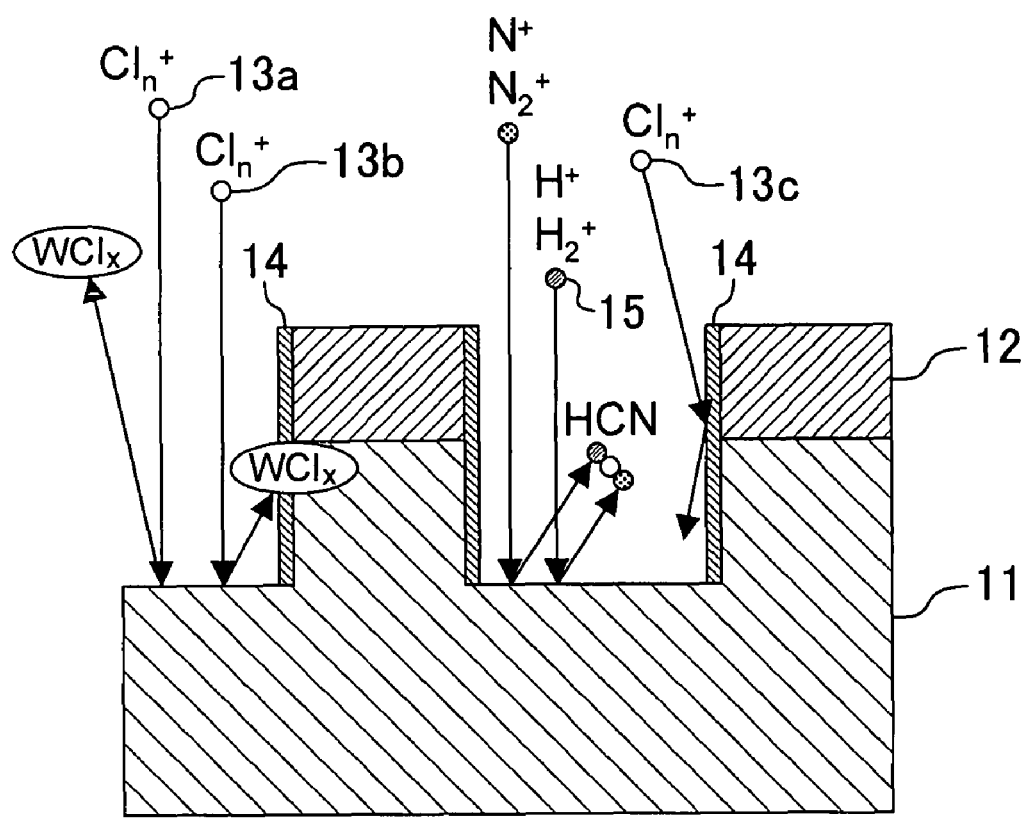
FIG. 2 is an explanatory diagram of a dry etching method according to Embodiment 2 of the invention.

FIG. 2 is an explanatory diagram of the dry etching method according to Embodiment 2 of the invention. Hereinafter, the dry etching method of this embodiment will be described by exemplifying the case where a chlorine molecule, a nitrogen molecule, and a hydrogen molecule are used as the gas including a chlorine atom, the gas including a nitrogen atom, and the gas including a hydrogen atom, respectively.

Referring to FIG. 2, in this embodiment, a resist pattern 12 is formed on a WC substrate 11, and then by using the resist pattern 12 as a mask, the WC substrate 11 is etched with $Cl_n^+$ (n=1 and 2) ions 13a, 13b, and 13c produced by chlorine molecules and hydrogen ions ($H^+$ and $H^{2+}$) 15 produced by hydrogen molecules. It is noted that hydrogen radicals are also produced by hydrogen molecules.

A difference point of the etching mechanism in this embodiment from that in the Embodiment 1 is the reaction for removing carbon. Specifically, also in this embodiment, as in the case of Embodiment 1, C in the WC substrate 11 is removed through etching in the form of $CCl_x$ (x=1 through 4) that is a reaction product with chlorine, particularly in the form of $CCl_4$, and also removed by nitrogen ions in the form of CN or $C_2N_2$. Since hydrogen in addition to nitrogen is supplied in this embodiment, C in the WC substrate 11 is removed also in the form of HCN with a lower vapor pressure than $CCl_x$, CN, and $C_2N_2$. Therefore, the effect of removing C dramatically increases, resulting in a highly increased tungsten etching rate by chlorine.

Accordingly, with Embodiment 2, it is possible to rapidly perform etching for forming a highly precise vertical shape free from a bowing shape on and within the WC alloy of a substance including tungsten and carbon.

In this embodiment, description has been made of the case where a chlorine molecule is used for the gas including a chlorine atom. Instead of the chlorine molecule, a hydrogen chloride molecule or a boron trichloride molecule may be used. Also, a mixture of two or all gases selected from a chlorine molecule, a hydrogen chloride molecule, and a boron trichloride molecule may be used instead. This enables easy handling of gas supply and the like because these molecules are relatively small in weight, and concurrently enables efficient chlorine production through plasma discharge. As a result, gas supply can be conducted at a low cost. Even though another gas including chlorine other than the aforementioned gases is used, the dry etching method of the invention is, of course, operable. However, in general, a larger molecule has a lower vapor pressure and may become in the form of a solid source. In this case, it is difficult to supply the molecule and the cost of using it increases.

Moreover, in this embodiment, a mixed gas of a gas including a chlorine atom, a gas including a nitrogen atom and a gas including a hydrogen atom is used. Instead of the gas including a chlorine atom, a gas including another halogen atom may be used. Alternatively, instead of the mixed gas of a gas including a chlorine atom, a gas including a nitrogen atom and a gas including a hydrogen atom, use may be made of a mixed gas of a gas including a chlorine atom or another halogen atom and a nitrogen atom (for example, $NF_3$, $N_2F$, $NCl_3$, $NBr_3$, or $NI_3$) and a gas including a hydrogen atom, or a mixed gas of a gas including a chlorine atom or another halogen atom and a gas including a nitrogen atom and a hydrogen atom (for example, $NH_3$).

Furthermore, in this embodiment, a nitrogen molecule is used as a gas including a nitrogen atom. Instead of this, use may be made of an ammonia molecule or a mixture of a nitrogen molecule and an ammonia molecule.

Moreover, in this embodiment, if a gas including an oxygen atom is mixed into the mixed gas of a gas including a chlorine atom, a gas including a nitrogen atom, and a gas including a hydrogen atom, the etching rate can be further increased. The reason for this is as follows: C remaining after removal of W by a chlorine ion is removed in the form of $CCl_x$ (x=1 through 4), CN, $C_2N_2$, and HCN that has a lower vapor pressure (that is, a higher volatility) than those, and in addition to this, an oxygen radical and an oxygen ion provide the effect of removing the C in the form of $CO_2$ or CO. This effect is sufficiently provided even when the flow rate of the gas including oxygen is less than 10% of the total flow rate of the gas including chlorine and the gas including oxygen. Practically, it is sufficient that the flow rate of the gas including oxygen is set to a desired flow rate within a range of approximately 50% or less of the total gas flow rate. In addition, if an oxygen molecule, a nitrogen oxide molecule, a sulfur oxide molecule, a carbon oxide molecule, or a mixture of two or more of them is used as the gas including an oxygen atom, oxygen can be supplied efficiently. Instead of mixing of the gas including an oxygen atom, a gas including a chlorine atom and an oxygen atom (a nitrogen atom or a hydrogen atom may be additionally included), such as $COCl_2$, $ClFO_3$, NOCl, $NO_2Cl$, $SOCl_2$, $SO_2Cl_2$, or $SO_3HCl$, may be used.

Furthermore, in this embodiment, if an inert gas is mixed into the mixed gas of a gas including a chlorine atom, a gas including a nitrogen atom, and a gas including a hydrogen atom, the plasma discharge can be further stabilized due to an inert gas effect, and hence, what is called a process window can be easily increased. Specifically, when an inert gas is mixed at a flow rate several times as large as the flow rate of the chlorine gas, the electron temperature within the plasma is regulated by the electron temperature of the inert gas, resulting in a stabilization of the plasma discharge. As the inert gas, for example, Ar may be used. Alternatively, when any of He, Ne, Ar, Kr, Xe and Rn is selectively used as the inert gas, the electron temperature within the plasma can be increased or reduced. In other words, the electron temperature of the plasma of an inert gas largely depends upon the first ionization energy of the inert gas. Therefore, when plasma with a higher electron temperature is desired to generate, an inert gas with a smaller atomic number can be used, and when plasma with a lower electron temperature is desired to generate, an inert gas with a larger atomic number can be used. At this point, two or more inert gases may be mixedly used.

Moreover, an etching system used in this embodiment may be any of a reactive ion etching (RIE) system of a parallel plate type or the like, a dual frequency parallel plate RIE system, a magnetron enhanced RIE (MERIE) system, an inductively coupled plasma (ICP) etching system, an electron cyclotron resonance (ECR) etching system, a UHF plasma etching system, and a neutral loop discharge (NLD) etching system.

Furthermore, although the WC substrate including tungsten and carbon as the principal components is etched in this embodiment, a metal, an insulating or a semiconductor substance having the substance including tungsten and carbon on its surface may be etched instead. Moreover, when the substance including tungsten and carbon further includes nitrogen, the same effects as those described in this embodiment can be attained. In other words, the same effects as those described in this embodiment can be attained also in etching a WCN alloy or a WNC alloy.

Embodiment 3

Now, a dry etching method according to Embodiment 3 of the invention will be described with reference to the accompanying drawings. A difference of the dry etching method of this embodiment from that of Embodiment 1 is that a substance including tungsten and carbon as principal components is dry etched by using plasma generated from a gas which is made by additionally mixing at least one of a gas including a bromine atom and a gas including an iodine atom into a mixed gas of a gas including a chlorine atom and a gas including a nitrogen atom.

Figure 3A:
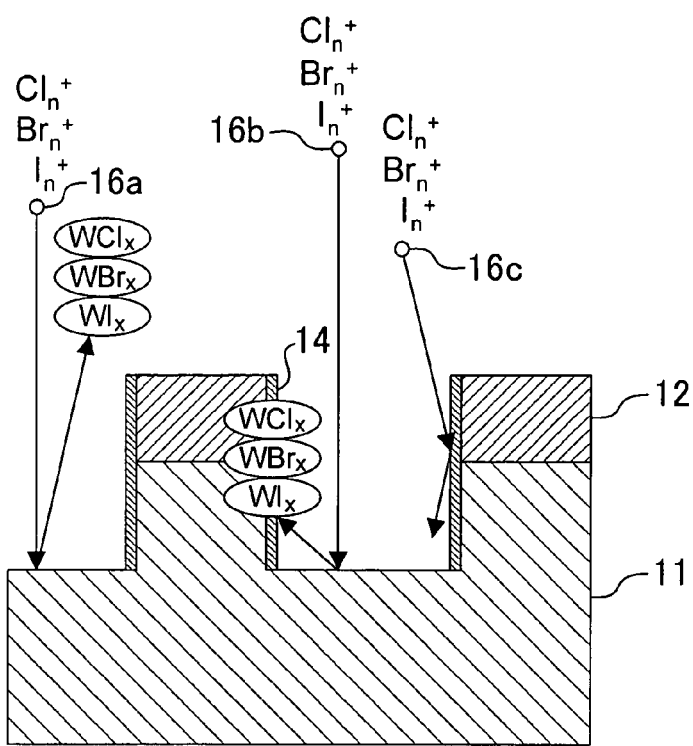
FIGS. 3(a) and 3(b) are explanatory diagrams of a dry etching method according to Embodiment 3 of the invention.
Figure 3B:
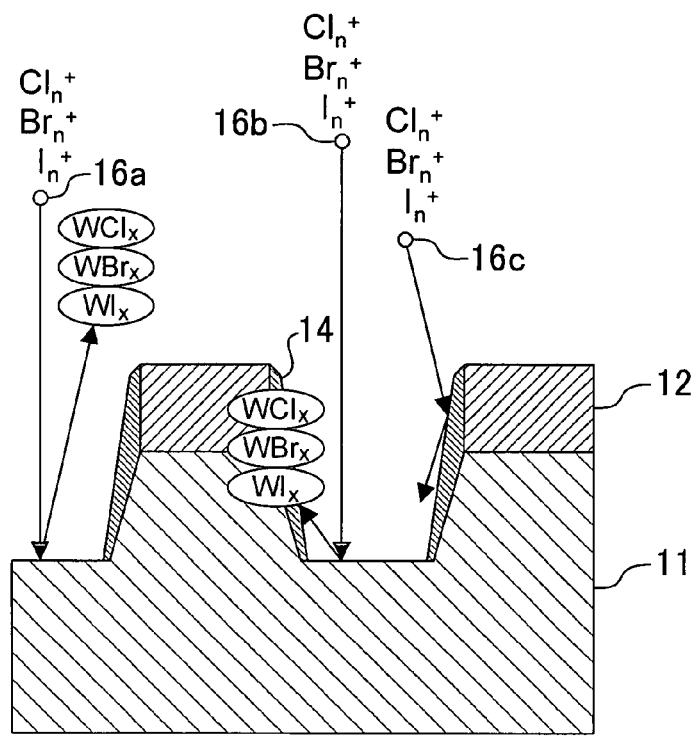

FIGS. 3(a) and 3(b) are explanatory diagrams of the dry etching method of Embodiment 3 of the invention, in each of which a state of a WC substrate being etched by the dry etching method is shown. It is noted that FIG. 3(a) shows a case where a sidewall protecting film is formed in a small thickness and FIG. 3(b) shows a case where a sidewall protecting film is formed in a large thickness. Now, the dry etching method of this embodiment will be described by exemplifying a case where $Cl_2$, $N_2$, $Br_2$ and $I_2$ are used as the gas including a chlorine atom, the gas including a nitrogen atom, the gas including a bromine atom, and the gas including an iodine atom, respectively.

As shown in FIGS. 3(a) and 3(b), in this embodiment, a resist pattern 12 is formed on a WC substrate 11. Then, by using the resist pattern 12 as a mask, the WC substrate 11 is etched with ions 16a, 16b, and 16c of a $Cl_n^+$ (n=1 and 2) ion produced by $Cl_2$, a $Br_n^+$ (n=1 and 2) ion produced by $Br_2$, or an $I_n^+$ (n=1 and 2) ion produced by 12. To be more specific, out of $Cl_n^+$ ions, $Br_n^+$ ions, and $I_n^+$ ions, the ion 16a substantially vertically entering the WC substrate 11 cuts a bond between W and C by its ion impact energy, and is chemically bonded to W. Then, resultant reaction products in the form of $WCl_x$ (x=1 through 6), $WBr_x$ (x=1 through 6), or $WI_x$ (x=1 through 6) are released into the gas phase, thereby removing W. Furthermore, some of etching reaction products produced by the ion 16b of a $Cl_n^+$ ion, a $Br_n^+$ ion or an $I_n^+$ ion are adsorbed again onto an etched side face of the WC substrate 11 or the side face of the resist pattern 12 to form a sidewall protecting film 14. The adsorption probabilities attained at this point are in the order of $WI_x > WBr_x > WCl_x$. As a result, the sidewall protecting film 14 prevents an etching reaction caused on the side face of the pattern of the WC substrate 11 by an ion 16c obliquely entering the WC substrate 11. Accordingly, in the case where the sidewall protecting film 14 is comparatively thin, a vertical etching shape can be realized on and inside the WC substrate 11 as shown in FIG. 3(a), and in the case where the sidewall protecting film 14 is comparatively thick, a downward tapered etching shape can be realized on and inside the WC substrate 11 as shown in FIG. 3(b).

In this embodiment, preferably, the mixing ratio of the gas including a bromine atom or the gas including an iodine atom to the total flow rate of the gas including a chlorine atom and the gas including a bromine atom or the gas including an iodine atom is set within the range of approximately 30% by volume or lower. Even when this mixing ratio is lower than approximately 5%, the effect of forming the sidewall protecting film by the gas including a bromine atom or the gas including an iodine atom can be sufficiently attained. Furthermore, the mixing ratio of the gas including a chlorine atom and the gas including a bromine atom, the mixing ratio of the gas including a chlorine atom and the gas including an iodine atom, or the mixing ratio of the gas including a chlorine atom, the gas including a bromine atom, and the gas including an iodine atom can be modified to change the thickness of the sidewall protecting film. For example, if these mixing ratios are less than 5%, the sidewall protecting film 14 with a relatively small thickness can be formed as shown in FIG. 3(a). In contrast to this, by increasing these mixing ratios, the sidewall protecting film 14 can be thickened. To be more specific, when these mixing ratios are 8% or higher, the thickness of the sidewall protecting film 14 gradually increases. Then, when they exceed approximately 10%, the sidewall protecting film 14 becomes thick to the extent to which etching for forming the etched cross-section in a downward tapered shape as shown in FIG. 3(b) can be attained. Strictly speaking, in this embodiment, the relation between the etching shape and the mixing ratio of a gas including a bromine atom or a gas including an iodine atom in the total gas flow rate subtly varies according to the mixing ratio and pressure of the gas including a nitrogen atom or the plasma generation condition such as plasma excitation power.

As described so far, according to Embodiment 3, the same effects as Embodiment 1 can be exerted. In addition to this, the following effects can be exerted. Specifically, by mixedly using the mixed gas of a gas including a chlorine atom and a gas including a nitrogen atom and at least one of a gas including a bromine atom and a gas including an iodine atom, the effect of bromine or iodine can enhance the effect of protecting the side face of the portion to be etched. With this, not only an etching for forming a vertical etching shape but also an etching for forming a downward tapered etching shape can be performed.

In this embodiment, description has been made of the case where a chlorine molecule is used for the gas including a chlorine atom. Instead of the chlorine molecule, a hydrogen chloride molecule or a boron trichloride molecule may be used. Also, a mixture of two or all gases selected from a chlorine molecule, a hydrogen chloride molecule, and a boron trichloride molecule may be used instead. This enables easy handling of gas supply and the like because these molecules are relatively small in weight, and concurrently enables efficient chlorine production through plasma discharge. As a result, gas supply can be conducted at a low cost. Even though another gas including chlorine other than the aforementioned gases is used, the dry etching method of the invention is, of course, operable. However, in general, a larger molecule has a lower vapor pressure and may become in the form of a solid source. In this case, it is difficult to supply the molecule and the cost of using it increases.

Moreover, in this embodiment, a mixed gas of a gas including a chlorine atom, a gas including a bromine atom or a gas including an iodine atom, and a gas including a nitrogen atom is used. Instead of this, use may be made of a mixed gas of a gas including a chlorine atom and a nitrogen atom (for example, $NCl_3$) and a gas including a bromine atom or a gas including an iodine atom, or a mixed gas of a gas including a chlorine atom and a gas including a bromine atom or an iodine atom and a nitrogen atom (for example, $NBr_3$ or $NI_3$).

Furthermore, in this embodiment, a nitrogen molecule is used as the gas including a nitrogen atom. Instead of this, use may be made of an ammonia molecule or a mixture of a nitrogen molecule and an ammonia molecule.

Furthermore, in this embodiment, description has been made of the case where $Br_2$ is exemplarily used as the gas including a bromine atom. Instead of this, for example, HBr may be used. Also, description has been made of the case where $I_2$ is exemplarily used as the gas including an iodine atom. Instead of this, for example, HI may be used. Or, a gas including a chlorine atom and at least one of a bromine atom and an iodine atom, such as ICl, $ClF_2Br$, $ClF_2I$ or BrCl, may be used. Alternatively, a molecular gas including carbon, fluorine and halogen, such as $CF_xCl_{4-x}$, $CF_xBr_{4-x}$ or $CF_xI_{4-x}$ (wherein x=1 through 3), may be used.

Moreover, in this embodiment, if a gas including an oxygen atom is mixed into the mixed gas of a gas including a chlorine atom, a gas including a bromine atom or an iodine atom, and a gas including a nitrogen atom, the etching rate can be further increased. The reason for this is as follows: C remaining after removal of W by a chlorine ion is removed in the form of $CCl_x$ (x=1 through 4) and CN or $C_2N_2$, and in addition to this, an oxygen radical and an oxygen ion provide the effect of removing the C in the form of $CO_2$ or CO. This effect is sufficiently provided even when the flow rate of the gas including oxygen is less than 10% of the total flow rate of the gas including chlorine and the gas including oxygen. Practically, it is sufficient that the flow rate of the gas including oxygen is set to a desired flow rate within a range of approximately 50% or less of the total gas flow rate. In addition, if an oxygen molecule, a nitrogen oxide molecule, a sulfur oxide molecule, a carbon oxide molecule, or a mixture of two or more of them is used as the gas including an oxygen atom, oxygen can be supplied efficiently. Instead of mixing of the gas including an oxygen atom, a gas including a chlorine atom and an oxygen atom (a bromine atom, an iodine atom, or a nitrogen atom may be additionally included), such as $COCl_2$, $ClFO_3$, NOCl, $NO_2Cl$, $SOCl_2$, $SO_2Cl_2$, or $SO_3HCl$, may be used.

Furthermore, in this embodiment, if an inert gas is mixed into the mixed gas of a gas including a chlorine atom, a gas including a bromine atom or a gas including an iodine atom, and a gas including a nitrogen atom, the plasma discharge can be further stabilized due to an inert gas effect, and hence, what is called a process window can be easily increased. Specifically, when an inert gas is mixed at a flow rate several times as large as the flow rate of the chlorine gas, the electron temperature within the plasma is regulated by the electron temperature of the inert gas, resulting in a stabilization of the plasma discharge. As the inert gas, for example, Ar may be used. Alternatively, when any of He, Ne, Ar, Kr, Xe and Rn is selectively used as the inert gas, the electron temperature within the plasma can be increased or reduced. In other words, the electron temperature of the plasma of an inert gas largely depends upon the first ionization energy of the inert gas. Therefore, when plasma with a higher electron temperature is desired to generate, an inert gas with a smaller atomic number can be used, and when plasma with a lower electron temperature is desired to generate, an inert gas with a larger atomic number can be used. At this point, two or more inert gases may be mixedly used.

In this embodiment, even though the gas including a chlorine atom is not used, in other words, even though instead of the gas including a chlorine atom, either of a gas including a bromine atom and a gas including an iodine atom or a mixture of them is used, it is possible to etch the substance including tungsten and carbon. In this case, the effect of bromine or iodine more effectively exerts the effect of protecting the side face of the portion to be etched, so that a mold having a fine concavo-convex pattern with vertical side faces or downward tapered side faces can be easily provided. In addition, since the etching in this embodiment employs not only those halogen gases but also a gas including a nitrogen atom, the mixing ratio of a halogen gas to a gas including a nitrogen atom can be adjusted to compensate a decrease in the etching rate due to the absence of a gas including a chlorine atom.

Moreover, an etching system used in this embodiment may be any of a reactive ion etching (RIE) system of a parallel plate type or the like, a dual frequency parallel plate RIE system, a magnetron enhanced RIE (MERIE) system, an inductively coupled plasma (ICP) etching system, an electron cyclotron resonance (ECR) etching system, a UHF plasma etching system, and a neutral loop discharge (NLD) etching system.

Furthermore, although the WC substrate including tungsten and carbon as the principal components is etched in this embodiment, a metal, an insulating or a semiconductor substance having the substance including tungsten and carbon on its surface may be etched instead. Moreover, when the substance including tungsten and carbon further includes nitrogen, the same effects as those described in this embodiment can be attained. In other words, the same effects as those described in this embodiment can be attained also in etching a WCN alloy or a WNC alloy.

Embodiment 4

Now, a fine structure formation method and a mold fabrication method by employing the same according to Embodiment 4 of the invention will be described with reference to the accompanying drawings. It is noted that the dry etching methods described in Embodiments 1 through 3 are applied in this embodiment.

FIGS. 4(a) through 4(f) are cross-sectional views for showing procedures in the mold fabrication method of Embodiment 4 of the invention.

Figure 4A:
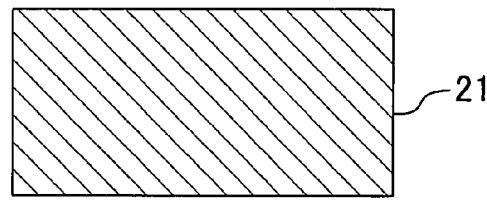
FIGS. 4(a), 4(b), 4(c), 4(d), 4(e) and 4(f) are cross-sectional views for showing procedures in a fine structure formation method according to Embodiment 4 of the invention and a mold fabrication method by employing the same.
Figure 4B:
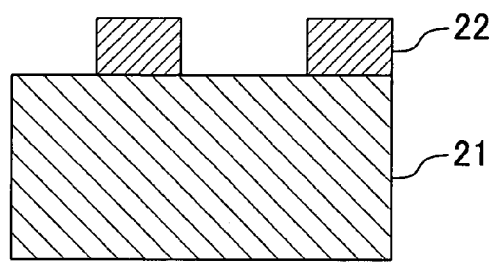

First, a WC alloy substrate 21 is prepared as shown in FIG. 4(a), and then, a resist pattern 22 is formed on the WC alloy substrate 21 as shown in FIG. 4(b). At this point, the resist pattern 22 is generally formed through a lithography technique.

Next, under etching conditions for forming a sidewall protecting film in a small thickness (see Embodiment 3 (and FIG. 3(a) in particular)), the WC alloy substrate 21 is dry etched, with the resist pattern 22 used as a mask, by using plasma generated from a mixed gas of at least a gas including a chlorine atom and a gas including a nitrogen atom, thereby transferring the pattern onto the WC alloy substrate 21. In general, no matter which type of dry etching system is used for the dry etching, ions 23 entering the WC alloy substrate 21 from the plasma have energy spread. Therefore, there are not only a component A vertically entering the substrate surface but also components entering the substrate surface at an angle, namely, obliquely entering components B and C. However, when the dry etching is performed by using the plasma generated from a mixed gas of at least a gas including a chlorine atom and a gas including a nitrogen atom, etching reaction products such as $WCl_x$ (wherein x=1 through 6) form a sidewall protecting film 24a on the side face of the etched portion, and therefore, the side face can be prevented from being etched by the obliquely entering components B and C of the ions 23. Accordingly, as shown in FIG. 4(c), a fine structure having, as the etched cross-section, a cross-section vertical to the substrate surface is formed.

Next, the resist pattern 22 and the sidewall protecting film 24a are removed by ashing and cleaning. In this manner, a WC alloy mold made of the WC alloy substrate 21 having a fine concavo-convex structure with vertical side faces is fabricated as shown in FIG. 4(d).

Figure 4C:
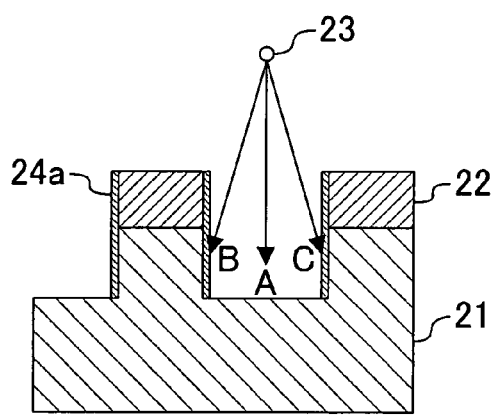
Figure 4E:
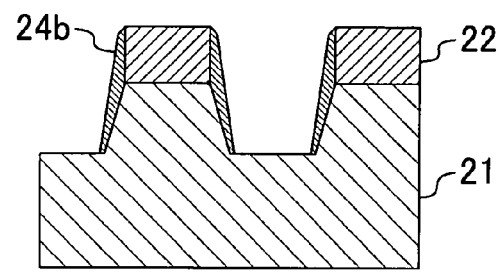
Figure 4D:
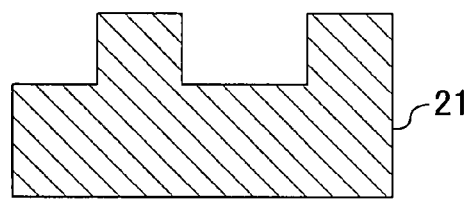

On the other hand, instead of the procedures shown in FIGS. 4(c) and 4(d), the pattern may be transferred onto the WC alloy substrate 21 by dry etching the WC alloy substrate 21, with the resist pattern 22 used as a mask, by using plasma generated from a mixed gas of at least a gas including a chlorine atom and a gas including a nitrogen atom under etching conditions for forming a sidewall protecting film in a large thickness (see Embodiment 3 (and FIG. 3(b) in particular)) as shown in FIG. 4(e). In this case, a fine structure having a downward tapered shape as the etched cross-section is formed in the WC alloy substrate 21. The reason for this is as follows: since a sidewall protecting film 24b is deposited in a thickness larger than a necessary thickness for preventing the side face from being etched by the ions, an opening area of the etched portion becomes narrower as the etching proceeds.

Figure 4F:
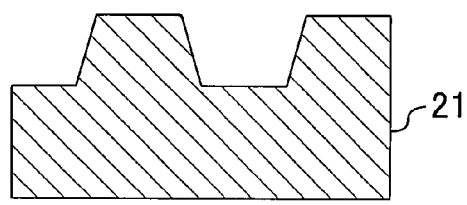

Next, the resist pattern 22 and the sidewall protecting film 24b are removed by the ashing and the cleaning. In this manner, a WC alloy mold made of the WC alloy substrate 21 having a fine concavo-convex structure with downward tapered side faces is fabricated as shown in FIG. 4(f).

As described so far, the fine structure formation method and the mold fabrication method of this embodiment include the steps of: forming a resist pattern on a substance including tungsten and carbon; and etching the substance, with the resist pattern used as a mask, by using plasma generated from a mixed gas of at least a gas including a chlorine atom and a gas including a nitrogen atom. In other words, since the dry etching method of this invention (according to any of Embodiments 1 through 3) is employed in this embodiment, the surface and the inside of the substance including tungsten and carbon can be etched in a highly precise vertical shape or a highly precise downward tapered shape free from a bowing shape. Accordingly, a mold having a fine concavo-convex pattern with a vertical cross-section or a downward tapered cross-section can be definitely fabricated.

Although the resist pattern is used as the etching mask in this embodiment, it goes without saying that a hard mask made of an insulating film or the like may be used instead.

In this embodiment, as the gas including a chlorine atom, a chlorine molecule, a hydrogen chloride molecule, a boron trichloride molecule or a mixture of two or more gases of them may be used. This enables easy handling of gas supply and the like because these molecules are relatively small in weight, and concurrently enables efficient chlorine production through plasma discharge. Therefore, the substance including tungsten and carbon can be etched into a vertical shape at more inexpensive cost and with high precision. As a result of this, a mold having a fine concavo-convex pattern with a side face in a highly precise vertical shape can be fabricated more inexpensively. Even though another gas including chlorine other than the aforementioned gases is used, the dry etching method of the invention is, of course, operable. However, in general, a larger molecule has a lower vapor pressure and may become in the form of a solid source. In this case, it is difficult to supply the molecule and the cost of using it increases.

In this embodiment, either of a nitrogen molecule and an ammonia molecule or a mixture of them may be used as the gas including a nitrogen atom. This enables easy handling of gas supply and the like because these molecules are relatively small in weight, and concurrently enables efficient nitrogen production through plasma discharge. Therefore, the substance including tungsten and carbon can be etched into a highly precise vertical shape at more inexpensive cost. As a result of this, a mold having a fine concavo-convex pattern with a side face in a highly precise vertical shape can be fabricated inexpensively.

In this embodiment, a gas including a hydrogen atom is further mixed into a mixed gas used for generating plasma. Thereby, hydrogen in addition to nitrogen is supplied, so that carbon in the substance including tungsten and carbon is removed in the form of $CCl_x$, CN, $C_2N_2$, and HCN with a lower vapor pressure than those. This dramatically increases the carbon removal effect, so that the effect of removing carbon in the substance including tungsten and carbon can be enhanced to raise the etching rate. Therefore, the substance including tungsten and carbon can be more rapidly etched into a highly precise vertical shape, so that a mold having a fine concavo-convex pattern with a side face in a highly precise vertical shape can be fabricated rapidly. In this process, a hydrogen molecule, an ammonia molecule, a hydrocarbon molecule, or a mixture of them may be used as the gas including a hydrogen atom. With this, handling of gas supply and the like is facilitated to enhance the practical use, and concurrently hydrogen atoms can be supplied efficiently. Therefore, the substance including tungsten and carbon can be etched more rapidly into a highly precise vertical shape at inexpensive cost. As a result of this, a mold having a fine concavo-convex pattern with a side face in a highly precise vertical shape can be fabricated inexpensively.

Moreover, in this embodiment, if a gas including an oxygen atom is additionally mixed into the mixed gas of a gas including a chlorine atom and a gas including a nitrogen atom, the etching rate can be increased. The reason for this is as follows: C remaining after removal of W by a chlorine ion is removed in the form of $CCl_x$ (x=1 through 4) and CN or $C_2N_2$, and in addition to this, an oxygen radical and an oxygen ion provide the effect of removing the C in the form of $CO_2$ or CO. This effect is sufficiently provided even when the flow rate of the gas including oxygen is less than 10% of the total flow rate of the gas to be supplied which is composed of the gas including chlorine and the gas including oxygen. Practically, it is sufficient that the flow rate of the gas including oxygen is set to a desired flow rate within a range of approximately 50% or less of the total gas flow rate. With this, the effect of adding oxygen raises the etching rate, so that the substance including tungsten and carbon can be etched rapidly into a highly precise vertical shape. As a result of this, a mold having a fine concavo-convex pattern with a side face in a highly precise vertical shape can be fabricated rapidly. In addition, preferably, an oxygen molecule, a nitrogen oxide molecule, a sulfur oxide molecule, a carbon oxide molecule, or a mixture of two or more of them is used as the gas including an oxygen atom. With this, oxygen can be supplied efficiently, so that the substance including tungsten and carbon can be etched rapidly and stably into a highly precise vertical shape. As a result of this, a mold having a fine concavo-convex pattern with a side face in a highly precise vertical shape can be fabricated rapidly and stably. Instead of mixing of the gas including an oxygen atom, use may be made of a gas including a chlorine atom and an oxygen atom, such as $COCl_2$, $CiFO_3$, NOCl, $NO_2Cl$, $SOCl_2$, $SO_2Cl_2$, or $SO_3HCl$.

Furthermore, in this embodiment, if an inert gas is additionally mixed into the mixed gas of a gas including a chlorine atom and a gas including a nitrogen atom, the plasma discharge can be further stabilized due to an inert gas effect, and hence, what is called a process window can be easily increased. Specifically, when an inert gas is mixed at a flow rate several times as large as the flow rate of the chlorine gas, the electron temperature within the plasma is regulated by the electron temperature of the inert gas, resulting in a stabilization of the plasma discharge. As the inert gas, for example, Ar may be used. Alternatively, when any of He, Ne, Ar, Kr, Xe and Rn is selectively used as the inert gas, the electron temperature within the plasma can be increased or reduced. In other words, the electron temperature of the plasma of an inert gas largely depends upon the first ionization energy of the inert gas. Therefore, when plasma with a higher electron temperature is desired to generate, an inert gas with a smaller atomic number can be used, and when plasma with a lower electron temperature is desired to generate, an inert gas with a larger atomic number can be used. At this point, two or more inert gases may be mixedly used.

In this embodiment, preferably, at least one of a gas including a bromine atom and a gas including an iodine atom is mixed into the mixed gas used for generating plasma. With this, the effect of bromine or iodine can enhance the effect of protecting the side face of the portion to be etched, so that not only an etching for forming a highly precise vertical shape but also an etching for forming a highly precise downward tapered shape can be performed. As a result, as compared with the case where only a gas including a chlorine atom and a gas including a nitrogen atom is used, an etching for forming a downward tapered shape as shown in FIGS. 4(e) and 4(f) can be realized easily. Therefore, not only a mold having a fine concavo-convex pattern with a side face in a highly precise vertical shape but also a mold having a fine concavo-convex pattern with a side face in a highly precise downward tapered shape can be fabricated.

Moreover, in this embodiment, a gas including a bromine atom, a gas including an iodine atom, or a mixture of them may be used instead of the gas including a chlorine atom. Also in this case, the effect of bromine or iodine can more effectively exerts the effect of protecting the side face of the portion to be etched, so that etching for forming a vertical shape or a downward tapered shape can be facilitated. Therefore, an etching for forming a downward tapered shape as shown in FIGS. 4(e) and 4(f) can be performed easily. As a result, not only a mold having a fine concavo-convex pattern with a side face in a highly precise vertical shape but also a mold having a fine concavo-convex pattern with a side face in a highly precise downward tapered shape can be fabricated. In this condition, $Br_2$, HBr, or the like may be used as the gas including a bromine atom, and $I_2$, HI, or the like may be used as the gas including an iodine atom. Or, a gas including a chlorine atom and at least one of a bromine atom and an iodine atom, such as ICl, $ClF_2Br$, $ClF_2I$ or BrCl, may be used. Alternatively, a molecular gas including carbon, fluorine and halogen, such as $CF_xCl_{4-x}$, $CF_xBr_{4-x}$ or $CF_xI_{4-x}$ (wherein x=1 through 3), may be used. In this case, the effect of increasing the etching rate obtained by F can be simultaneously exerted.

In this embodiment, in the case where the gas including a chlorine atom and at least one of a gas including a bromine atom and a gas including an iodine atom are mixedly used, preferably, the mixing ratio of the gas including a bromine atom or the gas including an iodine atom to the total flow rate of the gas including a chlorine atom and the gas including a bromine atom or the gas including an iodine atom is set within the range of approximately 30% by volume or lower. Even when this mixing ratio is lower than 5%, the effect of forming the sidewall protecting film by the gas including a bromine atom or the gas including an iodine atom can be sufficiently attained. Furthermore, the mixing ratio of the gas including a chlorine atom and the gas including a bromine atom, the mixing ratio of the gas including a chlorine atom and the gas including an iodine atom, or the mixing ratio of the gas including a chlorine atom, the gas including a bromine atom, and the gas including an iodine atom can be modified to change the thickness of the sidewall protecting film. For example, if these mixing ratios are less than 5%, the sidewall protecting film 24a with a relatively small thickness can be formed as shown in FIG. 4(c). Therefore, etching processing for forming an etched cross-section in a vertical shape can be performed. In contrast to this, by increasing these mixing ratios, the sidewall protecting film can be thickened. To be more specific, when these mixing ratios are 8% or higher, the thickness of the sidewall protecting film gradually increases. Then, when they exceed approximately 10%, the sidewall protecting film 24b becomes thick to the extent to which etching for forming the etched cross-section in a downward tapered shape as shown in FIG. 4(e) can be attained. As a result, not only a mold having a fine concavo-convex pattern with a side face in a highly precise vertical shape but also a mold having a fine concavo-convex pattern with a side face in a highly precise downward tapered shape can be fabricated.

As described so far, in the fine structure formation method and the mold fabrication method according to this embodiment, an etching processing can be performed which can form, on and inside the substance including tungsten and carbon, a highly precise vertical shape or a highly precise downward tapered shape free from a bowing shape. Therefore, in this embodiment, a mold which is made of the substance including tungsten and carbon and which has a fine concavo-convex pattern with a side face in a highly precise vertical shape or in a highly precise downward tapered shape can be fabricated.

Furthermore, the dimensional etching limit of the fine concavo-convex pattern obtained in the mold fabrication according to this embodiment largely depends upon the lithography technique employed for forming the resist pattern, and currently, the substance can be etched by the minimum dimension of approximately 50 nm.

Moreover, an etching system used in this embodiment may be any of a reactive ion etching (RIE) system of a parallel plate type or the like, a dual frequency parallel plate RIE system, a magnetron enhanced RIE (MERIE) system, an inductively coupled plasma (ICP) etching system, an electron cyclotron resonance (ECR) etching system, a UHF plasma etching system, and a neutral loop discharge (NLD) etching system.

Furthermore, although the WC substrate including tungsten and carbon as the principal components is etched in this embodiment, a metal, an insulating or a semiconductor substance having the substance including tungsten and carbon on its surface may be etched instead. Moreover, when the substance including tungsten and carbon further includes nitrogen, the same effects as those described in this embodiment can be attained. In other words, the same effects as those described in this embodiment can be attained also in etching a WCN alloy or a WNC alloy.

Embodiment 5

Now, a mold according to Embodiment 5 of the invention will be described with reference to the accompanying drawings. It is noted that the mold of this embodiment is obtained by the mold fabrication method described in Embodiment 4.

Figure 5A:
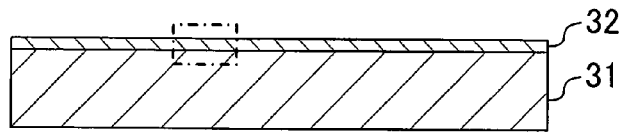
FIG. 5(a) is a cross-sectional view of a whole mold according to Embodiment 5 of the invention and FIGS. 5(b), 5(c), 5(d), 5(e), 5(f), and 5(g) are enlarged views for showing a fine concavo-convex pattern on the surface of the mold illustrated in FIG. 5(a).

FIG. 5(a) is a cross-sectional view of the whole mold of this embodiment. As shown in FIG. 5(a), a substance 32 including tungsten and carbon such as a WC alloy is formed on an underlying substrate 31. On the surface of the substance 32, a fine concavo-convex pattern with a vertical shape (a shape having a side face vertical to the substrate surface) or a downward tapered shape is formed by the dry etching method of any of Embodiments 1 through 3. Also, FIGS. 5(b) through 5(d) and 5(e) through 5(g) are enlarged views of the fine concavo-convex pattern formed on a surface portion (surrounded with an alternate long and short dash line) of the mold of FIG. 5(a).

Figure 5B:
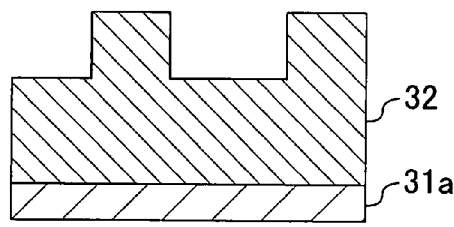
Figure 5E:
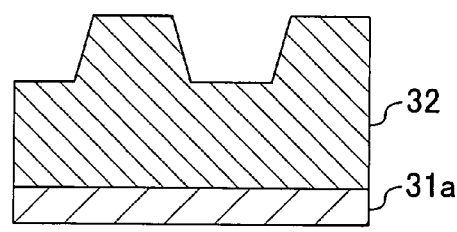
Figure 5C:
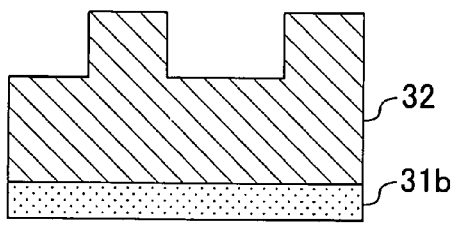
Figure 5F:
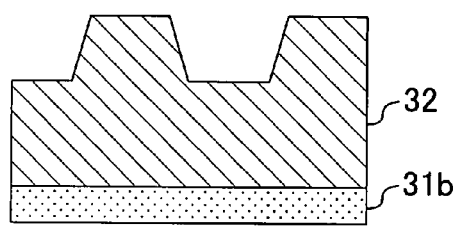
Figure 5D:
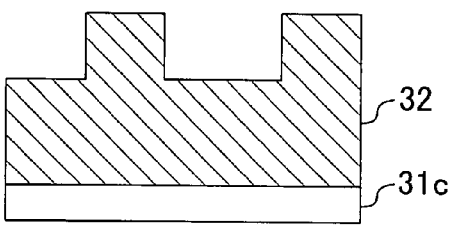
Figure 5G:
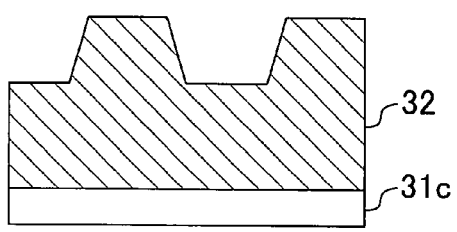

Since the mold of this embodiment is fabricated by dry etching the substance including tungsten and carbon by using plasma generated from a mixed gas of at least a gas including a chlorine atom and a gas including a nitrogen atom, formation can be made of a mold having a fine concavo-convex pattern in a vertical cross-section free from a bowing shape as shown in FIGS. 5(b) through 5(d), or a mold having a fine concavo-convex pattern in a downward tapered cross-section as shown in FIGS. 5(e) through 5(g).

Furthermore, as a characteristic the mold of this embodiment, a nitrogen content is higher in a portion closer to the etched face of the substance including tungsten and carbon (i.e., the substance 32).

The underlying substrate 31 of the mold may be a substrate 31a made of a metal or a conducting material (shown in FIG. 5(b) or 5(e)), a substrate 31b made of an insulating material (shown in FIG. 5(c) or 5(f)) or a substrate 31c made of a semiconductor material (shown in FIG. 5(d) or 5(g)), and the material for the substrate can be selected in accordance with the use of the mold. For example, in the case where the mold is used with a current allowed to flow therethrough, the substrate 31a can be selected as the underlying substrate 31. Alternatively, in the case where the mold is used with electrically insulated, the substrate 31b can be selected as the underlying substrate 31.

In this embodiment, as the gas including a chlorine atom for use in the mold fabrication, a chlorine molecule, a hydrogen chloride molecule, a boron trichloride molecule, or a mixture of two or more gases of them may be used. This enables easy handling of gas supply and the like because these molecules are relatively small in weight, and concurrently enables efficient chlorine production through plasma discharge. Therefore, a mold having a fine concavo-convex pattern with a side face in a highly precise vertical shape can be provided more inexpensively.

In this embodiment, either of a nitrogen molecule and an ammonia molecule or a mixture of them may be used as the gas including a nitrogen atom used for fabricating a mold. This enables easy handling of gas supply and the like because these molecules are relatively small in weight, and concurrently enables efficient nitrogen production through plasma discharge. Therefore, a mold having a fine concavo-convex pattern with a side face in a highly precise vertical shape can be provided more inexpensively.

Moreover, in this embodiment, preferably, a gas including a hydrogen atom is additionally mixed into a mixed gas used for generating plasma for use in the mold fabrication. Thus, hydrogen atoms in addition to nitrogen atoms are supplied, so that the effect of removing carbon in the substance including tungsten and carbon can be enhanced to raise the etching rate. Therefore, a mold having a fine concavo-convex pattern with a side face in a highly precise vertical shape can be fabricated more rapidly. In this condition, a hydrogen molecule, an ammonia molecule, a hydrocarbon molecule, or a mixture of them may be used as the gas including a hydrogen atom. With this, handling of gas supply and the like is facilitated to enhance the practical use, and concurrently hydrogen atoms can be supplied efficiently. As a result of this, a mold having a fine concavo-convex pattern with a side face in a highly precise vertical shape can be fabricated more rapidly and more inexpensively.

In this embodiment, preferably, a gas including an oxygen atom is mixed into the mixed gas for use in the mold fabrication. With this, the effect of adding oxygen increases the etching rate, so that a mold having a fine concavo-convex pattern with a side face in a highly precise vertical shape can be fabricated and provided rapidly. As the gas including an oxygen atom, preferably, use is made of an oxygen molecule, a nitrogen oxide molecule, a sulfur oxide molecule, a carbon oxide molecule, or a mixture of two or more of them. With this, oxygen can be supplied efficiently, so that a mold having a fine concavo-convex pattern with a side face in a highly precise vertical shape can be fabricated and provided rapidly and stably. Instead of mixing of the gas including an oxygen atom, use may be made of a gas including a chlorine atom and an oxygen atom (a nitrogen atom or the like may be additionally included), such as $COCl_2$, $ClFO_3$, $NOCl$, $NO_2Cl$, $SOCl_2$, $SO_2Cl_2$, or $SO_3HCl$.

Furthermore, in this embodiment, preferably, an inert gas is mixed into the mixed gas for use in the mold fabrication. With this, the plasma discharge can be further stabilized due to an inert gas effect, so that a mold having a fine concavo-convex pattern with a side face in a highly precise vertical shape can be fabricated and provided more stably.

Moreover, in this embodiment, preferably, at least one of a gas including a bromine atom and a gas including an iodine atom is mixed into the mixed gas for use in the mold fabrication. With this, the effect of bromine or iodine can enhance the effect of protecting the side face of the portion to be etched, so that not only a mold having a fine concavo-convex pattern with a side face in a highly precise vertical shape but also a mold having a fine concavo-convex pattern with a side face in a highly precise downward tapered shape can be provided. Instead of mixing of at least one of the gas including a bromine atom and the gas including an iodine atom, a gas including a chlorine atom and at least one of a bromine atom and an iodine atom, such as $ICl$, $ClF_2Br$, $ClF_2I$ or $BrCl$, may be used.

In this embodiment, not a gas including a chlorine atom but a gas including a bromine atom, a gas including an iodine atom, or a mixture of them may be used. With this, the effect of bromine or iodine more effectively enhances the effect of protecting the side face of the portion to be etched, so that a mold having a fine concavo-convex pattern with a side face in a highly precise vertical shape and a side face in a highly precise downward tapered shape can be fabricated easily.

In this manner, according to this embodiment, a mold having a fine concavo-convex pattern etched with high precision can be provided inexpensively, easily and stably. Also, a fine concavo-convex pattern having a side face in any shape, as the cross-sectional shape of the fine concavo-convex pattern, ranging from a shape vertical to the substrate surface to a downward tapered shape (namely, a shape in which the upper base is longer than the lower base in the cross-section of each recess) can be freely formed in the WC alloy or the like.

Furthermore, the dimensional etching limit of the fine concavo-convex pattern obtained in the mold of this embodiment largely depends upon the lithography technique employed for forming the resist pattern, and currently, the substance can be etched by the minimum dimension of approximately 50 nm. Also, the mold of this embodiment can be used in various applications ranging from fabrication of an optical circuit component with a large processing dimension to nano-imprint where the minimum dimension is pursued. Moreover, since the mold of this embodiment has the etched cross-section in a vertical shape or a downward tapered shape free from bowing, a material onto which the concavo-convex pattern is transferred is not clogged up in recesses of the mold. Then, the mold can be easily peeled off after the transfer. Furthermore, in order to increase the use durability of the mold of this embodiment by more definitely preventing the clogging of the mold, the fine concavo-convex surface of the mold of this embodiment is subjected to a surface treatment with a metal, Teflon-coating, a silicon coupling agent or the like. The material used in such a surface treatment is arbitrarily selected in accordance with the material onto which the concavo-convex pattern is transferred by using the mold.

Although the substance including tungsten and carbon is used as the material of the surface portion of the mold in this embodiment, the same effects as those of this embodiment can be attained even when the substance further includes nitrogen. In other words, the same effects as those of this embodiment can be attained also when a WCN alloy or a WNC alloy is used.

Embodiment 6

A dry etching method according to Embodiment 6 of the invention will now be described with reference to the accompanying drawings. The dry etching method according to this embodiment is characterized in that a substance including W and C is etched by using plasma generated from a mixed gas of a gas including a fluorine atom and a gas including a nitrogen atom.

Figure 6A:
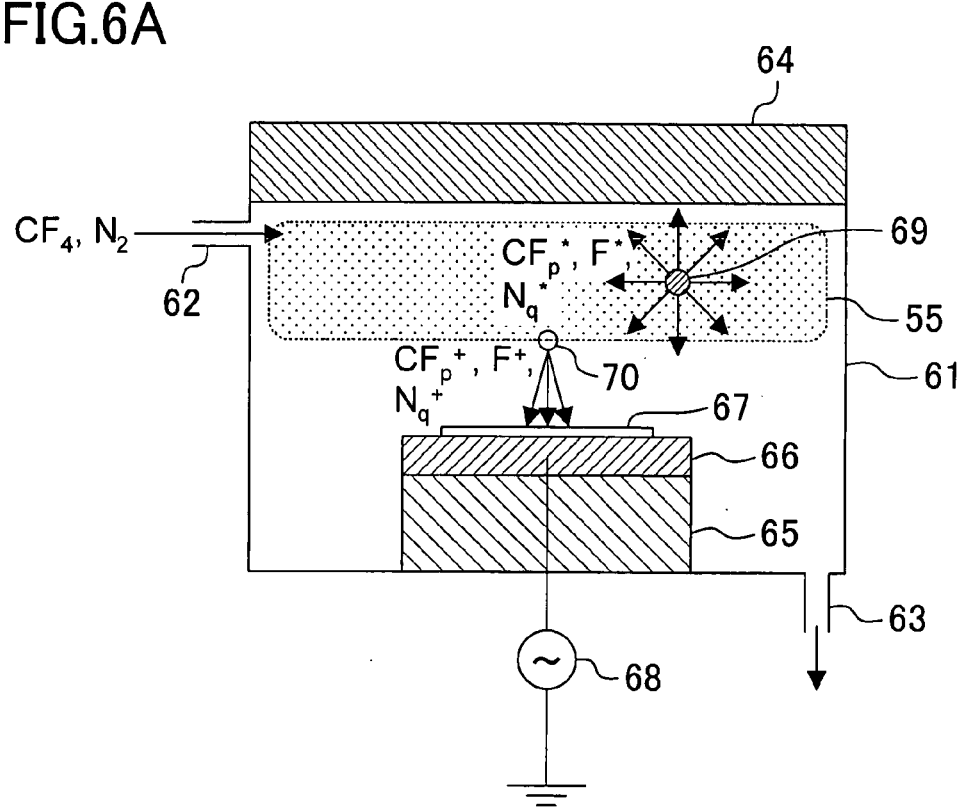
FIGS. 6(a) and 6(b) are explanatory diagrams of a dry etching method according to Embodiment 6 of the invention.
Figure 6B:
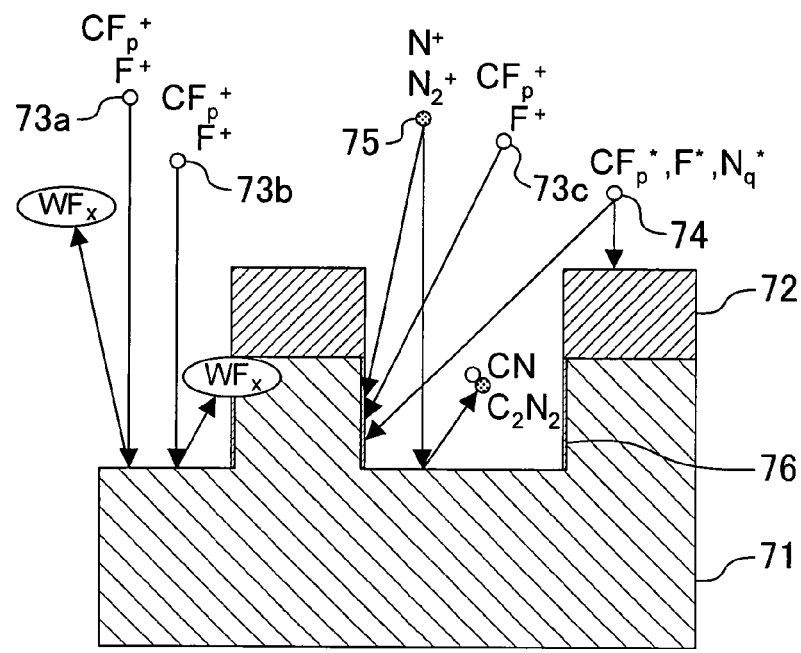

FIGS. 6(a) and 6(b) are explanatory diagrams of the dry etching method of Embodiment 6 of the invention. As shown in FIG. 6(a), a reaction chamber 61 in which a reduced pressure can be kept is provided with a gas inlet 62 and a gas outlet 63. Also, a plasma generator 64 for changing a gas supplied through the gas inlet 62 into plasma is provided in an upper portion of the reaction chamber 61. Furthermore, an electrode 66 on which a target substance including tungsten and carbon, specifically, a WC alloy substrate or a substrate having a WC alloy in its surface portion (hereinafter both referred to as a WC substrate 67), is placed is provided on an insulator 65 in a lower portion of the reaction chamber 61. An RF (radio frequency) power source 68 for applying a bias voltage to the electrode 66 is provided outside the reaction chamber 61.

Next, the operation of the etching system shown in FIG. 6(a), namely, the dry etching method of this embodiment, will be described by exemplifying the case where $CF_4$ and $N_2$ are used as a gas including a fluorine atom and a gas including a nitrogen atom, respectively. As shown in FIG. 6(a), a $CF_4$ gas and a $N_2$ gas are introduced through the gas inlet 62 into the reaction chamber 61, and plasma 55 of the introduced $CF_4$ gas and $N_2$ gas is generated by the plasma generator 64 and at the same time, RF bias is applied to the WC substrate 67 by the RF power source 68. As a result, radicals 69 of carbon fluoride radicals $CF_p^*$ (p=1, 2, and 3), nitrogen radicals $N_q^+$ (q=1 and 2), and fluorine radicals F* and ions 70 of carbon fluoride ions $CF_p^+$ (p=1, 2, and 3), nitrogen ions $N_q^+$ (q=1 and 2), and fluorine ions $F^+$ are produced in the plasma 55 with the $CF_4$ gas and the $N_2$ gas mixed.

The radicals 69 isotropically diffuse to reach the WC substrate 67, but the ions 70 are accelerated between the plasma 55 and the WC substrate 67 and hence enter the WC substrate 67 substantially vertically. At this point, $CF_p^+$ (p=1, 2, and 3) ions and $F^+$ ions of the ions 70 cut bonds between W and C by their kinetic energies to react with W, resulting in an release of $WF_x$ (wherein x=1 through 6). On the other hand, by nitrogen ions ($N_q^+$ (q=1 and 2)), C is removed through etching mainly in the form of CN or $C_2N_2$. Also, C incorporates H supplied from a resist (not shown in FIG. 6(a)), and thereby is removed through etching in the form of HCN or re-released in the form of $CF_x$ (x=1 through 4).

The etching reaction caused on the surface of the WC substrate will be described in more detail with reference to FIG. 6(b). FIG. 6(b) shows a state of the WC substrate being etched by the dry etching method of this embodiment. As shown in FIG. 6(b), after forming a resist pattern 72 on a WC substrate 71, by using the resist pattern 72 as a mask, the WC substrate 71 is etched with ions 73a, 73b and 73c of $CF_p^+$ (p=1, 2, and 3) ions and $F^+$ ions, radicals 74 of $CF_p^*$ (p=1, 2, and 3) radicals, $N_q^*$ (q=1 and 2) radicals, and F* radicals, and ions 75 of $N^+$ ions and $N_2^+$ ions. Then, W included in the WC substrate 71 is released in the form of $WF_x$ (x=1 through 6) which will form a sidewall protecting film 76 mainly made of a CFNH polymer.

Next, the functions of the ions and the radicals will be described. Out of $CF_p^+$ (wherein p=1, 2 and 3) ions and $F^+$ ions, the ion 73a substantially vertically entering the WC substrate 71 cuts a bond between W and C by its ion impact energy, and F reacts with W to produce a reaction product of $WF_x$. At this point, the $WF_x$ reacts with a plurality of incident ions 73a a plurality of times, and ultimately released into the gas phase as a molecule of $WF_5$ or $WF_6$ or the like. This is the principal etching mechanism for the W included in the WC substrate 71. Furthermore, like the ion 73b, some ions chemically react with W on the surface subjected to the etching reaction, and a resultant reaction product $WF_x$ is released into the gas phase to be adsorbed onto the pattern side face of the WC substrate 71 and the side face of the resist pattern 72 during the etching. The $WF_x$ adsorbed onto the pattern side face of the WC substrate 71 is deposited on that side face, and some amount of $WF_x$ may be incorporated in the sidewall protecting film 76 of a CFNH polymer with a small thickness. In this case, the sidewall protecting film 76 actually formed is a mixture of a CHFN polymer and a $WF_x$ compound.

Ions 75 of $N^+$ ions and $N_2^+$ ions enter the WC substrate 71, and cut bonds between W and C by their ion impact energies. Then, they chemically react with C to principally produce a reaction product represented by CN or $C_2N_2$. This can efficiently remove C to improve the etching efficiency for tungsten by fluorine. Also, C incorporates H coming from the resist due to sputtering to produce HCN, and is removed through etching in the form of HCN. These are the principal etching mechanism for the C included in the WC substrate 71. It is noted that some amount of C is re-released, by the ion impact caused by $CF_p^+$ (p=1, 2, and 3) ions and $F^+$ ions, from the WC substrate 71 in the form of $CF_x$ (x=1 through 4).

As described so far, in this embodiment, not only the mechanism for W etching but also the mechanism for positive C etching for removal is present. Therefore, these etchings generate a synergistic effect to enable a rapid etching processing.

On the other hand, the radicals 74 of $CF_p^*$ (p=1, 2, and 3) radicals, $N_q^*$ (q=1 and 2) radicals, and F* radicals isotropically diffuse from the plasma gas phase to be transported to the surface of the WC substrate 71. These radicals 74 are basically physically or chemically adsorbed onto the surface of the substrate or onto the surface of the pattern, and the adsorbed radicals receive the impact energies of other ions entering those surfaces and cause chemical reactions through what is called an ion assist etching reaction. Then, they are desorbed from those surfaces. Accordingly, under conditions where the etching proceeds, through the ion assist etching reaction, most substances adsorbed onto the bottom of the pattern are removed through the etching together with part of the WC substrate 71. However, since the amount of incident ions is smaller on the side face of the pattern than on the bottom of the pattern, the amount of adsorbed radicals is larger than the amount of ions allowing etching to proceed. Thus, a deposition is produced to form the sidewall protecting film 76. As a result of this, the principal components of the sidewall protecting film 76 are C, F and N, that is a combination of compositions of the supplied radicals. If H coming from the resist pattern 72 by sputtering is further added thereinto, the sidewall protecting film 76 of a CFNH polymer is then formed. In other words, by readsorption of $WF_x$ onto the pattern side face and adsorption of carbon fluoride radicals and nitrogen radicals supplied from the plasma onto the pattern side face, a CFNH film with a small thickness is formed as the sidewall protecting film 76. In this step, N is added to the CF film to increase the strength of the sidewall protecting film 76.

In the conventional technique, the sidewall protecting film is not formed. Therefore, like the ion 73c, $CF_p^+$ (p=1, 2, and 3) ions and $F^+$ ions obliquely enter the substrate, whereby the pattern side face is etched into a bowing shape.

On the contrary, in this embodiment, the presence of the sidewall protecting film 76 described above prevents the pattern side face from being etched by ions, so that the bowing shape as caused in the conventional technique can be avoided. As a result, a pattern with side faces in a vertical or downward tapered shape can be formed.

Moreover, in this embodiment, nitrogen ions are implanted into the WC substrate 71 in the early stage of formation of the sidewall protecting film 76, and a CFNH polymer is formed on the implanted surface. Therefore, a thin WCN layer is formed on the pattern side face.

In this manner, the essence of this invention is to use plasma generated from a mixed gas of a gas including a fluorine atom and a gas including a nitrogen atom in order to etch the substance including W and C. With this procedure, a sidewall protecting film of a thin CFNH polymer is formed on a side face of a fine structure being etched, so that the effects described above can be obtained.

In this embodiment, as the gas including a fluorine atom, use may be made of a fluorine molecule, fluorocarbon, fluorohydrocarbon, or a mixture of two or more of them. For example, a gas of $F_2$, $CF_4$, $C_2F_6$, $C_3F_8$, $C_4F_6$, $C_4F_8$ (cyclic or linear), $C_5F_8$ (cyclic or linear), $CHF_3$, $CH_2F_2$, $CH_3F$, or the like, or a CF gas with a higher molecular weight for ecological use may be used. A combination of these gases may be used. When such a gas is used, fluorine necessary for etching of tungsten (W) included in the substance including W and C is efficiently produced through the plasma discharge. If a gas with a low deposition property, such as $F_2$, $CF_4$, or $C_2F_6$, is used as the gas including a fluorine atom, a thin CFNH polymer is formed as described above. On the other hand, if a gas with a high deposition property, such as $C_3F_8$, $C_4F_6$, $C_4F_8$ (cyclic or linear), $C_5F_8$ (cyclic or linear), $CHF_3$, $CH_2F_2$, or $CH_3F$, is used, a thick CFNH polymer can be formed. As a result, the substance including W and C can be formed into a downward tapered shape. Also in this formation, a thin WCN layer is formed on the pattern side face.

Furthermore, in this embodiment, the mixed gas of a gas including a fluorine atom and a gas including a nitrogen atom is used. Instead of this, a gas including a fluorine atom and a nitrogen atom (for example, $NF_3$) may be used.

Moreover, in this embodiment, as the gas including a nitrogen atom, use may be made of a nitrogen molecule, an ammonia molecule, or a mixture of a nitrogen molecule and an ammonia molecule. Use of such a gas can efficiently generate nitrogen ions through plasma discharge, so that carbon in the substance including W and C can be efficiently removed through etching.

In this embodiment, preferably, a gas including a hydrogen atom is additionally mixed into the mixed gas of a gas including a fluorine atom and a gas including a nitrogen atom. With this, hydrogen atoms in addition to nitrogen atoms are supplied to the surface subjected to the etching reaction, so that C in the substance including W and C can be efficiently removed through etching in the form of HCN, resulting in an increased etching rate. In this condition, the gas including a hydrogen atom may be made of a hydrogen molecule, an ammonia molecule, a hydrocarbon molecule, or a mixture of two or more of them. With this, handling of gas supply and the like is facilitated to enhance the practical use, and concurrently hydrogen atoms can be supplied with high efficiency. As the hydrocarbon molecule, use can be made of a molecule of $C_{2i}H_{(2i+2)}$, $C_{2i}H_{(2i+1)}$, $C_{2i}H_{2i}$ or the like (wherein i is a natural number). The hydrocarbon molecule may be linear or cyclic. It goes without saying that the hydrocarbon molecule is not limited to a molecule represented as above. Specifically, $CH_4$, $C_2H_4$, $C_2H_6$, ..., $C_4H_8$, ... can be used. However, more preferably, a saturated hydrocarbon molecule, $C_{2i}H_{(2i+2)}$, is practically used. Since saturated hydrocarbon molecules do not include a double bond in its inside, it can be easily decomposed through the plasma discharge, and a larger amount of hydrogen can be generated than other hydrocarbon gases. Moreover, $CH_r$ (wherein r=1 through 3) radicals can be efficiently produced as a decomposition product. Particularly, since such a small decomposition (dissociation) molecule has a small adsorption coefficient, it can enter the inside of a fine structure pattern with a high aspect ratio (a depth/width ratio). This also provides the effect of strengthening formation of the sidewall protecting film by $CH_r$ during etching. In particular, $CH_4$, which is the smallest molecule among saturated hydrocarbon molecules, has the largest H/C ratio. Therefore, $CH_4$ is the hydrocarbon molecule capable of generating hydrogen most efficiently, and also has the lowest deposition property among hydrocarbon molecules. This property is remarkable particularly when $CH_4$ is compared with molecules not dissociated. Therefore, $CH_4$ is the easiest to handle and practically the most effective hydrocarbon gas.

Furthermore, in this embodiment, a gas including an oxygen atom may be additionally mixed into the mixed gas of a gas including a fluorine atom and a gas including a nitrogen atom. In this condition, if an oxygen molecule, a nitrogen oxide molecule, a sulfur oxide molecule, a carbon oxide molecule, or a mixture of two or more of them is used as the gas including an oxygen atom, oxygen can be supplied efficiently. Since addition of a gas including oxygen can efficiently generate oxygen radicals through plasma discharge, carbon in the substance including W and C and a deposition such as an excessive portion of a sidewall protecting film can be appropriately removed and concurrently the etching rate can be increased. This is because in addition to the aforementioned effect of removing the carbon, the effect of removing the carbon in the form of $CO_2$ or CO is caused by an oxygen radical or an oxygen ion. Practically, the flow rate of the gas including oxygen can be set to a desired flow rate within a range of approximately 50% or less of the whole gas flow rate. It is noted that as the gas including a fluorine atom, use may be made of a gas including a fluorine atom and an oxygen atom, for example, hydrofluoroether (HFE) and the like such as HFE-347mcf ($CF_3CF_2CH_2OCHF_2$), HFE-356mec ($CF_3CHFCF_2OCH_3$), HFE-347 pc-f ($CHF_2CF_2OCH_2CF_3$), HFE-356mf-c (CF$_3$CH$_2$OCF$_2$OCH$_3$), HFE-458 mmzc ((CF$_3$)$_2$CHCF$_2$OCH$_3$), HFE-449mcf-c (CF$_3$CF$_2$CH$_2$OCH$_2$CHF$_2$), HFE-449mec-f (CF$_3$CHFCF$_2$OCH$_2$CF$_3$), HFE-356pcf (CHF$_2$CF$_2$CH$_2$OCHF$_2$), HFE-54-11mec-f (CF$_3$CHFCF$_2$OCH$_2$CF$_2$CF$_3$), HFE-458mecf (CF$_3$CHFCF$_2$CH$_2$OCHF$_2$), HFE-458 pcf-c (CHF$_2$CF$_2$CH$_2$OCF$_2$CHF$_2$), or HFE-55-10mec-fc (CF$_3$CHFCF$_2$OCH$_2$CF$_2$CHF$_2$). These gases are alternative gases for chlorofluorocarbon for use against the global warming.

Moreover, in this embodiment, an inert gas may be additionally mixed into the mixed gas of a gas including a fluorine atom and a gas including a nitrogen atom. If an inert gas is mixed thereinto, the plasma discharge can be further stabilized due to an inert gas effect. Therefore, what is called a process window can be easily increased. Specifically, by mixing an inert gas at a flow rate several times as large as the flow rate of the mixed gas of a gas including a fluorine atom and a gas including a nitrogen atom, the electron temperature within the plasma is regulated by the electron temperature of the inert gas, resulting in a stabilization of the plasma discharge. As the inert gas, for example, Ar may be used. Alternatively, when any of He, Ne, Ar, Kr, Xe and Rn is selectively used as the inert gas, the electron temperature within the plasma can be increased or reduced. In other words, the electron temperature of the plasma of an inert gas largely depends upon the first ionization energy of the inert gas. Therefore, when plasma with a higher electron temperature is desired to generate, an inert gas with a smaller atomic number can be used, and when plasma with a lower electron temperature is desired to generate, an inert gas with a larger atomic number can be used. At this point, two or more inert gases may be mixedly used.

In this embodiment, a gas including a chlorine atom, a gas including a bromine atom, a gas including an iodine atom, or two or more of them may be mixed into the mixed gas of a gas including a fluorine atom and a gas including a nitrogen atom. Thus, tungsten is etched by Cl$^+$ ions, Br$^+$ ions, or I$^+$ ions, and resultant reaction products of WCl$_x$, WBr$_x$, or WI$_x$ (x=1 through 6) are released into the gas phase, thereby removing W. Furthermore, some of etching reaction products of WCl$_x$, WBr$_x$, or WI$_x$ (x=1 through 6), which are produced by Cl$^+$ ions, Br$^+$ ions, or I$^+$ ions, are adsorbed again onto an etched side face of the WC substrate 71 or the side face of the resist pattern 72 to form a sidewall protecting film. The adsorption probabilities attained at this point are in the order of WI$_x$>WBr$_x$>WCl$_x$. As a result, the sidewall protecting film prevents an etching reaction caused on the side face of the pattern of the WC substrate 71 by an ion obliquely entering the WC substrate 71. Accordingly, in the case where the sidewall protecting film is comparatively thin, a vertical etching shape can be realized on and inside the WC substrate 71 as shown in FIG. 7(c) in Embodiment 7 that will be described later, and in the case where the sidewall protecting film is comparatively thick, a downward tapered etching shape can be realized on and inside the WC substrate 71 as shown in FIG. 7(e) in Embodiment 7.

In the case described above, preferably, the mixing ratio of the gas including a chlorine atom and the gas including a bromine atom or the gas including an iodine atom to the gas including a fluorine atom is set within the range of approximately 30% by volume or lower. Even when this mixing ratio is lower than 5%, the effect of forming the sidewall protecting film by the gas including a chlorine atom, the gas including a bromine atom or the gas including an iodine atom can be sufficiently attained. Furthermore, the mixing ratio of the gas including a fluorine atom and the gas including a chlorine atom, the mixing ratio of the gas including a fluorine atom and the gas including a bromine atom, or the mixing ratio of the gas including a fluorine atom and the gas including an iodine atom can be modified to change the thickness of the sidewall protecting film. For example, if these mixing ratios are less than 5%, a sidewall protecting film with a relatively small thickness can be formed. In contrast to this, by increasing these mixing ratios, the sidewall protecting film can be thickened. To be more specific, when these mixing ratios are 8% or higher, the thickness of the sidewall protecting film gradually increases. Then, when they exceed approximately 10%, the sidewall protecting film becomes thick to the extent to which etching for forming the etched cross-section in a downward tapered shape can be attained. Strictly speaking, in this embodiment, the relation between the etching shape and the mixing ratio of a gas including a bromine atom, a gas including an iodine atom, or the like in the total gas flow rate subtly varies according to the mixing ratio and pressure of the gas including a nitrogen atom or the plasma generation condition such as plasma excitation power.

As described so far, according to this embodiment, by mixedly using the mixed gas of a gas including a fluorine atom and a gas including a nitrogen atom and at least one of a gas including a chlorine atom, a gas including a bromine atom, or a gas including an iodine atom, the effect of chlorine, bromine or iodine can enhance the effect of protecting the side face of the portion to be etched. With this, not only an etching for forming a vertical etching shape but also an etching for forming a downward tapered etching shape can be performed. In this condition, Cl$_2$, HCl, BCl$_3$, ClF$_3$, or the like may be used as the gas including chlorine. Also, Br$_2$, HBr, or the like may be used as the gas including bromine, and I$_2$, HI, or the like may be used as the gas including iodine. Or, a gas including a chlorine atom and at least one of a bromine atom and an iodine atom, such as ICl, ClF$_2$Br, ClF$_2$I or BrCl, may be used. Alternatively, a molecular gas including carbon, fluorine and halogen, such as CF$_x$Cl$_{4-x}$, CF$_x$Br$_{4-x}$ or CF$_x$I$_{4-x}$ (wherein x=1 through 3), may be used.

Moreover, an etching system used in this embodiment may be any of a reactive ion etching (RIE) system of a parallel plate type or the like, a dual frequency parallel plate RIE system, a magnetron enhanced RIE (MERIE) system, an inductively coupled plasma (ICP) etching system, an electron cyclotron resonance (ECR) etching system, a UHF plasma etching system, and a neutral loop discharge (NLD) etching system. Also, the optimal etching conditions are different depending upon the method employed by the etching system, and the ranges of the etching conditions of this embodiment are, for example, a gas flow rate of several tens through several hundreds of cubic centimeters per minute (at room temperature), a pressure of 0.1 through 20 Pa, a high-frequency power for plasma generation of a hundred through several thousands of watts, and an RF bias voltage of a hundred through a thousand of watts.

Furthermore, although the WC substrate including tungsten and carbon as the principal components is etched in this embodiment, a metal, an insulating or a semiconductor substance having the substance including tungsten and carbon on its surface may be etched instead. Moreover, when the substance including tungsten and carbon further includes nitrogen, the same effects as those described in this embodiment can be attained. In other words, the same effects as those described in this embodiment can be attained also in etching a WCN alloy or a WNC alloy.

Embodiment 7

Now, a fine structure formation method and a mold fabrication method by employing the same according to Embodiment 7 of the invention will be described with reference to the accompanying drawings. It is noted that the dry etching methods described in Embodiment 6 are applied in this embodiment.

FIGS. 7(a) through 7(f) are cross-sectional views for showing procedures in the mold fabrication method of Embodiment 7 of the invention.

Figure 7A:
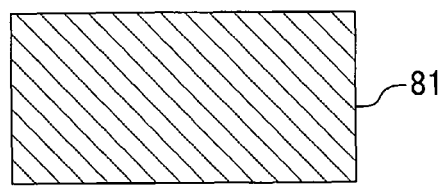
FIGS. 7(a), 7(b), 7(c), 7(d), 7(e) and 7(f) are cross-sectional views for showing procedures in a fine structure formation method according to Embodiment 7 of the invention and a mold fabrication method by employing the same.
Figure 7B:
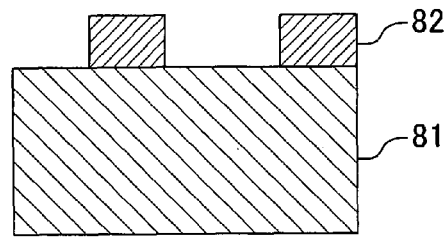
Figure 7C:
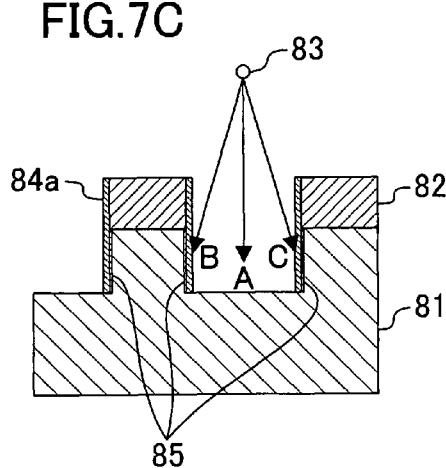
Figure 7E:
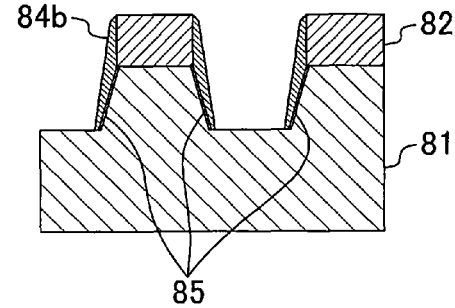

First, a WC alloy substrate 81 is prepared as shown in FIG. 7(a), and then, a resist pattern 82 is formed on the WC alloy substrate 81 as shown in FIG. 7(b). At this point, the resist pattern 82 is generally formed through a lithography technique.

Next, as shown in FIG. 7(c), under etching conditions for forming a sidewall protecting film in a small thickness, that is, using, as a gas including a fluorine atom, a gas with a low deposition property such as $F_2$, $CF_4$, or $C_2F_6$, the WC alloy substrate 81 is dry etched, with the resist pattern 82 used as a mask, by using plasma generated from a mixed gas of at least a gas including a fluorine atom and a gas including a nitrogen atom, thereby transferring the pattern onto the WC alloy substrate 81. In general, no matter which type of dry etching system is used for the dry etching, ions 83 entering the WC alloy substrate 81 from the plasma have energy spread. Therefore, there are not only a component A vertically entering the surface of the WC substrate but also components entering the substrate surface at an angle, namely, obliquely entering components B and C. However, when the dry etching is performed by using the plasma generated from the mixed gas of at least a gas including a fluorine atom and a gas including a nitrogen atom, a CFNH polymer forms a sidewall protecting film 84a on the side face of the etched portion, and therefore, the side face can be prevented from being etched by the obliquely entering components B and C of the ions 83. Accordingly, as shown in FIG. 7(c), a fine structure having, as the etched cross-section, a cross-section vertical to the substrate surface is formed. During this formation, before the sidewall protecting film 84a with a small thickness is formed, nitrogen ions are implanted to form a WCN layer 85 (serving as an underlying layer of the sidewall protecting film 84a) with a small thickness on the side face of the WC alloy substrate 81.

Figure 7D:
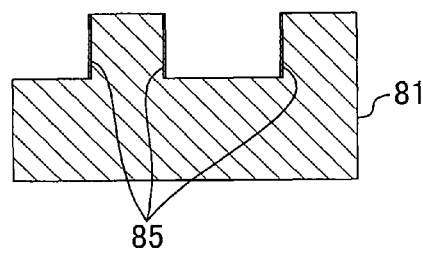

Next, the resist pattern 82 and the sidewall protecting film 84a are removed by ashing and cleaning. In this manner, a WC alloy mold made of the WC alloy substrate 81 having a fine concavo-convex structure with vertical side faces is fabricated as shown in FIG. 7(d). In this construction, the WCN layer 85 is formed on the side face of the fine concavo-convex structure.

On the other hand, instead of the procedures shown in FIGS. 7(c) and 7(d), the pattern may be transferred onto the WC alloy substrate 81 by dry etching the WC alloy substrate 81, with the resist pattern 82 used as a mask as shown in FIG. 7(e), by using plasma generated from the mixed gas of at least a gas including a fluorine atom and a gas including a nitrogen atom under etching conditions for forming a sidewall protecting film in a large thickness, that is, using a gas with a high deposition property such as $C_3F_8$, $C_4F_6$, $C_4F_8$ (cyclic or linear), $C_5F_8$ (cyclic or linear), $CHF_3$, $CH_2F_2$, $CH_3F$, or the like. In this case, a fine structure having a downward tapered shape as the etched cross-section is formed in the WC alloy substrate 81. The reason for this is as follows: since a sidewall protecting film 84b is deposited in a thickness larger than a necessary thickness for preventing the side face from being etched by the ions, an opening area of the etched portion becomes narrower as the etching proceeds.

Figure 7F:
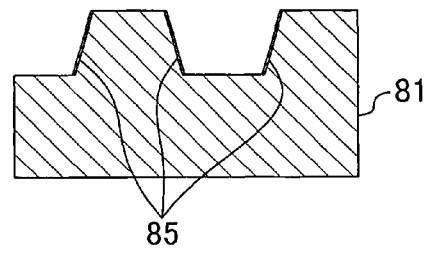

Next, the resist pattern 82 and the sidewall protecting film 84b are removed by the ashing and the cleaning. In this manner, a WC alloy mold made of the WC alloy substrate 81 having a fine concavo-convex structure with downward tapered side faces is fabricated as shown in FIG. 7(f). In this construction, the WCN layer 85 is formed on the side face of the fine concavo-convex structure.

As described so far, the fine structure formation method and the mold fabrication method of this embodiment include the steps of: forming a resist pattern on a substance including tungsten and carbon; and etching the substance, with the resist pattern used as a mask, by using plasma generated from a mixed gas of at least a gas including a fluorine atom and a gas including a nitrogen atom. In other words, since the dry etching method of this invention (according to Embodiment 6) is employed in this embodiment, the surface and the inside of the substance including tungsten and carbon can be etched in a highly precise vertical shape or a highly precise downward tapered shape free from a bowing shape. Accordingly, a mold having a fine concavo-convex pattern with a vertical cross-section or a downward tapered cross-section can be definitely fabricated.

Although the resist pattern is used as the etching mask in this embodiment, it goes without saying that a hard mask made of an insulating film or the like may be used instead.

In this embodiment, as the gas including a fluorine atom, use may be made of a fluorine molecule, fluorocarbon, fluorohydrocarbon, or a mixture of two or more of them. For example, a gas of $F_2$, $CF_4$, $C_2F_6$, $C_3F_8$, $C_4F_6$, $C_4F_8$ (cyclic or linear), $C_5F_8$ (cyclic or linear), $CHF_3$, $CH_2F_2$, $CH_3F$, or the like, or a CF gas with a higher molecular weight for ecological use may be used. A combination of these gases may be used. When such a gas is used, fluorine necessary for etching of tungsten (W) included in the substance including W and C can be efficiently produced through plasma discharge. If a gas with a low deposition property, such as $F_2$, $CF_4$, or $C_2F_6$, is used as the gas including a fluorine atom, a thin CFNH polymer is formed as described above. On the other hand, if a gas with a high deposition property, such as $C_3F_8$, $C_4F_6$, $C_4F_8$ (cyclic or linear), $C_5F_8$ (cyclic or linear), $CHF_3$, $CH_2F_2$, or $CH_3F$, is used, a thick CFNH polymer can be formed. As a result, the substance including W and C can be formed into a downward tapered shape. Also in this formation, a thin WCN layer is formed on the pattern side face.

Furthermore, in this embodiment, the mixed gas of a gas including a fluorine atom and a gas including a nitrogen atom is used. Instead of this, a gas including a fluorine atom and a nitrogen atom (for example, $NF_3$) may be used.

Moreover, in this embodiment, as the gas including a nitrogen atom, use may be made of a nitrogen molecule ($N_2$), an ammonia molecule ($NH_3$), or a mixture of a nitrogen molecule and an ammonia molecule. Use of such a gas can efficiently generate nitrogen ions through plasma discharge, so that carbon in the substance including W and C can be efficiently removed through etching. Thus, a fine structure can be formed rapidly, whereby a mold can be fabricated inexpensively.

In this embodiment, preferably, a gas including a hydrogen atom is additionally mixed into the mixed gas of a gas including a fluorine atom and a gas including a nitrogen atom. With this, hydrogen atoms in addition to nitrogen atoms are supplied to the surface subjected to the etching reaction, so that C in the substance including W and C can be efficiently removed through etching in the form of HCN, resulting in an increased etching rate. As a result, a fine pattern can be formed rapidly, whereby a mold can be fabricated inexpensively. In this condition, preferably, the gas including a hydrogen atom is made of a hydrogen molecule, an ammonia molecule, a hydrocarbon molecule, or a mixture of two or more of them. With this, handling of gas supply and the like is facilitated to enhance the practical use, and concurrently hydrogen atoms can be supplied with high efficiency. As the hydrocarbon molecule, use can be made of a molecule of $C_{2i}H_{(2i+2)}$, $C_{2i}H_{(2i+1)}$, $C_{2i}H_{2i}$ or the like (wherein i is a natural number). The hydrocarbon molecule may be linear or cyclic. It goes without saying that the hydrocarbon molecule is not limited to a molecule represented as above. Specifically, $CH_4$, $C_2H_4$, $C_2H_6$, ..., $C_4H_8$, ... can be used. Particularly, in the case where a hydrogen molecule or an ammonia molecule is used as the gas including a hydrogen atom, a fine structure with a vertical cross-section shown in FIG. 7(c) can be fabricated, so that a mold having a fine concavo-convex structure with a vertical side face shown in FIG. 7(d) can be fabricated. On the other hand, in the case where hydrocarbon is used as the gas including a hydrogen atom, a fine structure with a downward tapered cross-section shown in FIG. 7(e) can be formed, so that a mold having a fine concavo-convex structure with a downward tapered side face shown in FIG. 7(f) can be fabricated.

Furthermore, in this embodiment, a gas including an oxygen atom may be mixed into the mixed gas of a gas including a fluorine atom and a gas including a nitrogen atom. In this condition, if an oxygen molecule, a nitrogen oxide molecule, a sulfur oxide molecule, a carbon oxide molecule, or a mixture of two or more of them is used as the gas including an oxygen atom, oxygen can be supplied efficiently. Therefore, the substance including W and C can be rapidly and stably etched into a highly precise vertical shape. As a result, a mold having a fine concavo-convex pattern with a side face in a highly precise vertical shape can be fabricated rapidly and stably. In addition, the approach of additionally mixing an oxygen atom into the mixed gas of a gas including a fluorine atom and a gas including a nitrogen atom is effective particularly in using, as the gas including a fluorine atom, a gas with a high deposition property such as $C_3F_8$, $C_4F_6$, $C_4F_8$ (cyclic or linear), $C_5F_8$ (cyclic or linear), $CHF_3$, $CH_2F_2$, or $CH_3F$. It is noted that as the gas including a fluorine atom, use may be made of a gas including a fluorine atom and an oxygen atom, for example, hydrofluoroether (HFE) and the like such as HFE-347mcf ($CF_3CF_2CH_2OCHF_2$), HFE-356mec ($CF_3CHFCF_2OCH_3$), HFE-347 pc-f ($CHF_2CF_2OCH_2CF_3$), HFE-356mf-c ($CF_3CH_2OCF_2OCH_3$), HFE-458 mmzc (($CF_3$)$_2$CHCF$_2$OCH$_3$), HFE-449mcf-c ($CF_3CF_2CH_2OCH_2CHF_2$), HFE-449mec-f ($CF_3CHFCF_2OCH_2CF_3$), HFE-356pcf ($CHF_2CF_2CH_2OCHF_2$), HFE-54-11 mec-f ($CF_3CHFCF_2OCH_2CF_2CF_3$), HFE-458mecf ($CF_3CHFCF_2CH_2OCHF_2$), HFE-458 pcf-c ($CHF_2CF_2CH_2OCF_2CHF_2$), or HFE-55-10mec-fc ($CF_3CHFCF_2OCH_2CF_2CHF_2$). These gases are alternative gases for chlorofluorocarbon for use against the global warming.

Moreover, in this embodiment, an inert gas may be additionally mixed into the mixed gas of a gas including a fluorine atom and a gas including a nitrogen atom. If an inert gas is mixed thereinto, the plasma discharge can be further stabilized due to an inert gas effect. Therefore, the substance including W and C can be more stably etched into a highly precise vertical shape. As a result, a mold having a fine concavo-convex pattern with a side face in a highly precise vertical shape can be fabricated more stably.

In this embodiment, a gas including a chlorine atom, a gas including a bromine atom, a gas including an iodine atom, or two or more of them may be mixed into the mixed gas of a gas including a fluorine atom and a gas including a nitrogen atom. With this, the effect of a chlorine atom, a bromine atom, or an iodine atom can enhance the effect of protecting the side face of the portion to be etched, so that etching can be performed to form not only a vertical shape but also a downward tapered shape. In this condition, $Cl_2$, HCl, $BCl_3$, $ClF_3$, or the like may be used as the gas including chlorine. Also, $Br_2$, HBr, or the like may be used as the gas including bromine, and $I_2$, HI, or the like may be used as the gas including iodine. Or, a gas including a chlorine atom and at least one of a bromine atom and an iodine atom, such as ICl, $ClF_2Br$, $ClF_2I$ or BrCl, may be used. Alternatively, a molecular gas including carbon, fluorine and halogen, such as $CF_xCl_{4-x}$, $CF_xBr_{4-x}$ or $CF_xI_{4-x}$ (wherein x=1 through 3), may be used.

Moreover, an etching system used in this embodiment may be any of a reactive ion etching (RIE) system of a parallel plate type or the like, a dual frequency parallel plate RIE system, a magnetron enhanced RIE (MERIE) system, an inductively coupled plasma (ICP) etching system, an electron cyclotron resonance (ECR) etching system, a UHF plasma etching system, and a neutral loop discharge (NLD) etching system.

Furthermore, although the WC substrate including tungsten and carbon as the principal components is etched in this embodiment, a metal, an insulating or a semiconductor substance having the substance including tungsten and carbon on its surface may be etched instead. Moreover, when the substance including tungsten and carbon further includes nitrogen, the same effects as those described in this embodiment can be attained. In other words, the same effects as those described in this embodiment can be attained also in etching a WCN alloy or a WNC alloy.

Embodiment 8

Now, a mold according to Embodiment 8 of the invention will be described with reference to the accompanying drawings. It is noted that the mold of this embodiment is obtained by the mold fabrication method described in Embodiment 7.

Figure 8A:
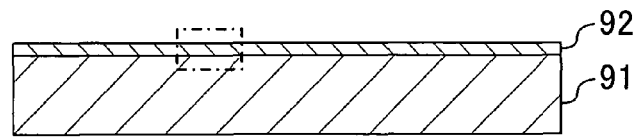
FIG. 8(a) is a cross-sectional view of a whole mold according to Embodiment 8 of the invention and FIGS. 8(b), 8(c), 8(d), 8(e), 8(f) and 8(g) are enlarged views for showing a fine concavo-convex pattern on the surface of the mold illustrated in FIG. 8(a).

FIG. 8(a) is a cross-sectional view of the whole mold of this embodiment. As shown in FIG. 8(a), a substance 92 including tungsten and carbon such as a WC alloy is formed on an underlying substrate 91. On the surface of the substance 92, a fine concavo-convex pattern with a vertical shape (a shape having a side face vertical to the substrate surface) or a downward tapered shape is formed by the dry etching method of Embodiment 6. Also, FIGS. 8(b) through 8(d) and 8(e) through 8(g) are enlarged views of the fine concavo-convex pattern formed on a surface portion (surrounded with an alternate long and short dash line) of the mold of FIG. 8(a).

Figure 8B:
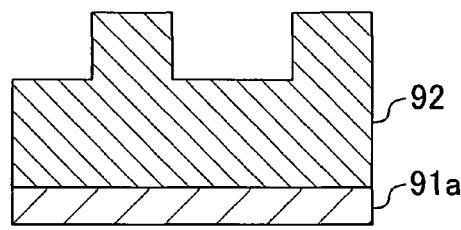
Figure 8E:
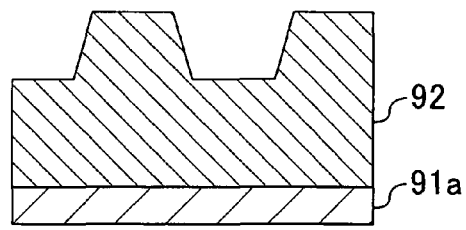
Figure 8C:
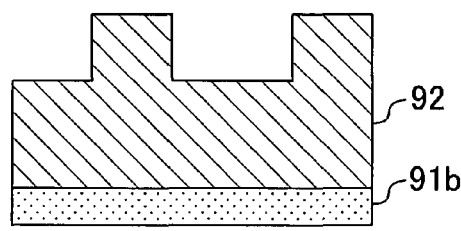
Figure 8F:
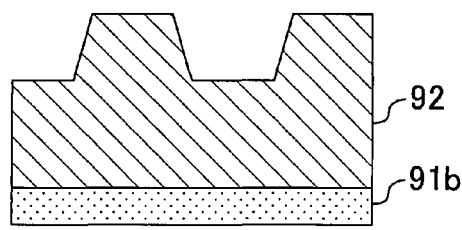
Figure 8D:
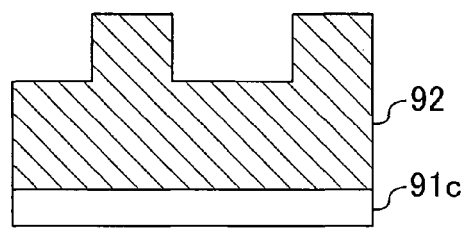
Figure 8G:
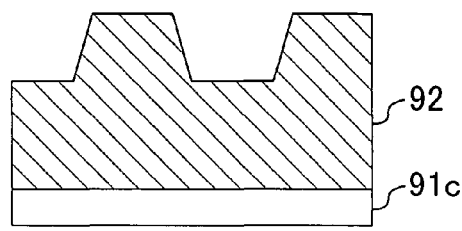
Figure 9A:
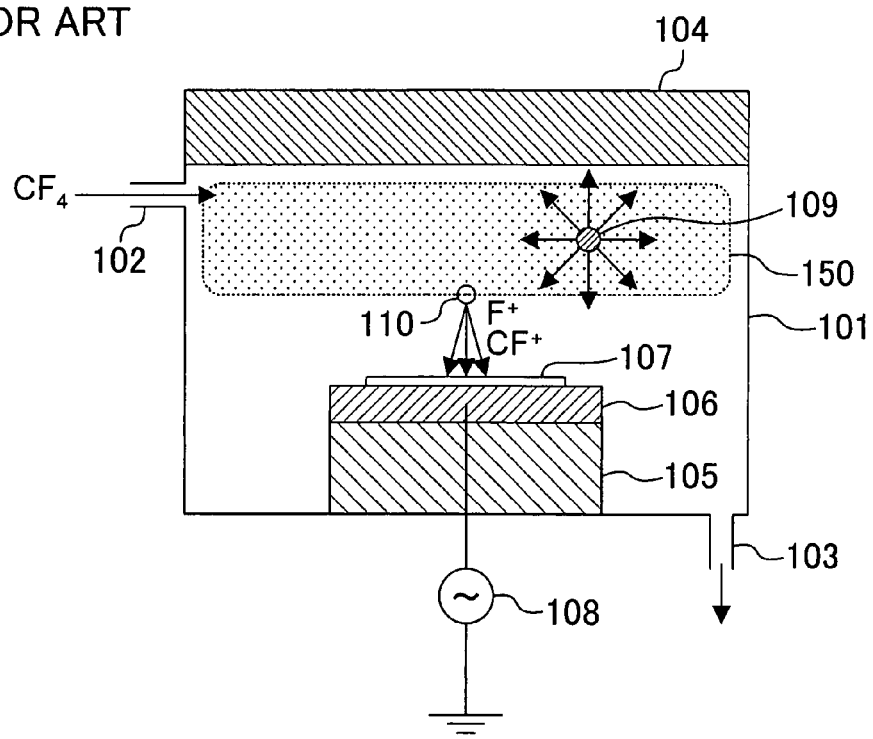
FIGS. 9(a) and 9(b) are explanatory diagrams of a conventional dry etching method.
Figure 9B:
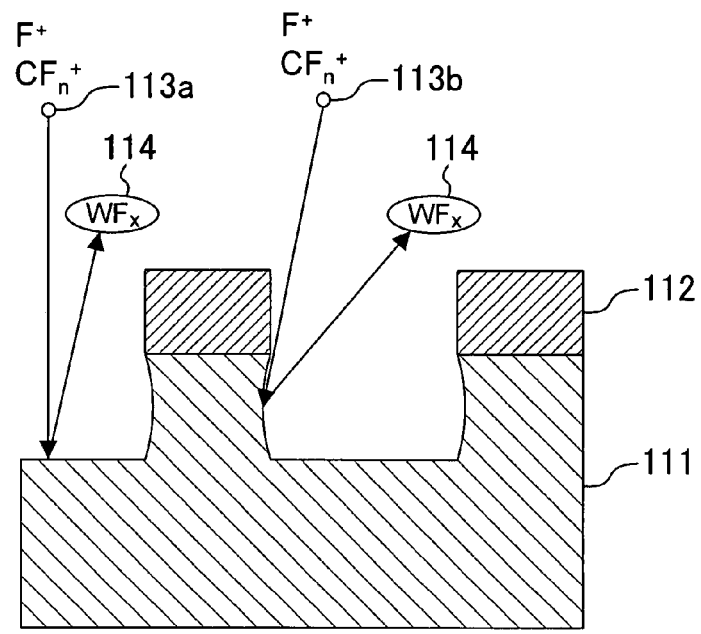
Figure 10A:
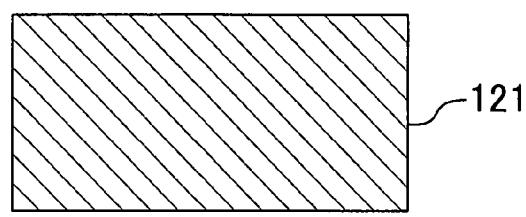
FIGS. 10(a), 10(b), 10(c) and 10(d) are cross-sectional views for showing procedures in a conventional fine structure formation method and a conventional mold fabrication method by employing the same.
Figure 10B:
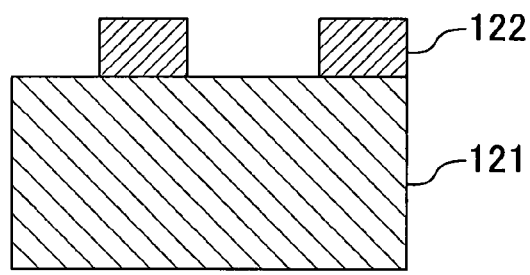
Figure 10C:
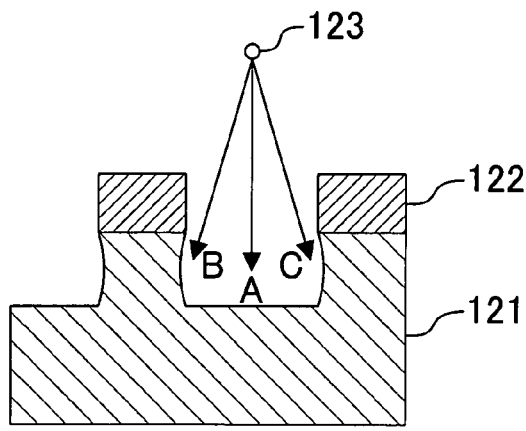
Figure 10D:
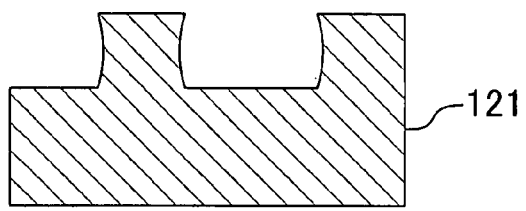

Since the mold of this embodiment is fabricated by dry etching the substance including tungsten and carbon by using plasma generated from a mixed gas of at least a gas including a fluorine atom and a gas including a nitrogen atom, formation can be made of a mold having a fine concavo-convex pattern in a vertical cross-section free from a bowing shape as shown in FIGS. 8(b) through 8(d), or a mold having a fine concavo-convex pattern in a downward tapered cross-section as shown in FIGS. 8(e) through 8(g).

Furthermore, as a characteristic the mold of this embodiment, a nitrogen content is higher in a portion closer to the etched face of the substance including tungsten and carbon (i.e., the substance 92).

The underlying substrate 91 of the mold may be a substrate 91a made of a metal or a conducting material (shown in FIG. 8(b) or 8(e)), a substrate 91b made of an insulating material (shown in FIG. 8(c) or 8(f)) or a substrate 91c made of a semiconductor material (shown in FIG. 8(d) or 8(g)), and the material for the substrate can be selected in accordance with the use of the mold. For example, in the case where the mold is used with a current allowed to flow therethrough, the substrate 91a can be selected as the underlying substrate 91. Alternatively, in the case where the mold is used with electrically insulated, the substrate 91b can be selected as the underlying substrate 91.

In this embodiment, as the gas including a fluorine atom for use in the mold fabrication, a fluorine molecule, fluorocarbon, fluorohydrocarbon, or a mixture of two or more thereof. With this, fluorine for W etching can be supplied efficiently, so that a mold having a fine concavo-convex pattern with vertical or downward tapered cross-section can be fabricated rapidly and inexpensively.

Furthermore, in this embodiment, the mixed gas of a gas including a fluorine atom and a gas including a nitrogen atom is used. Instead of this, a gas including a fluorine atom and a nitrogen atom (for example, $NF_3$) may be used.

Moreover, in this embodiment, a nitrogen molecule, an ammonia molecule, or a mixture of them may be used as the gas including a nitrogen atom used for fabricating a mold. With this, nitrogen atoms can be produced efficiently through plasma discharge. Therefore, a mold having a fine concavo-convex pattern with a side face in a highly precise vertical shape or in a highly precise downward tapered shape can be provided more rapidly and inexpensively.

In this embodiment, preferably, a gas including a hydrogen atom is additionally mixed into the mixed gas used for generating plasma for use in the mold fabrication. Thus, hydrogen atoms in addition to nitrogen atoms are supplied, so that the effect of removing carbon in the substance including tungsten and carbon can be enhanced to raise the etching rate. Therefore, a mold having a fine concavo-convex pattern with a side face in a highly precise vertical shape or in a highly precise downward tapered shape can be fabricated rapidly and inexpensively. In this condition, preferably, the gas including a hydrogen atom includes a hydrogen molecule, an ammonia molecule, a hydrocarbon molecule, or a mixture of two or more of them. With this, handling of gas supply and the like is facilitated to enhance the practical use, and in addition hydrogen atoms can be supplied with high efficiency. As a result of this, a mold having a fine concavo-convex pattern with a side face in a highly precise vertical shape or in a highly precise downward tapered shape can be fabricated more rapidly and more inexpensively.

In this embodiment, preferably, a gas including an oxygen atom is mixed into the mixed gas for use in the mold fabrication. With this, the effect of adding oxygen increases the etching rate, so that a mold having a fine concavo-convex pattern with a side face in a highly precise vertical shape or in a highly precise downward tapered shape can be fabricated and provided rapidly and inexpensively. In this condition, if an oxygen molecule, a nitrogen oxide molecule, a sulfur oxide molecule, a carbon oxide molecule, or a mixture of two or more of them is used as the gas including an oxygen atom, oxygen can be supplied efficiently. It is noted that as the gas including a fluorine atom, use may be made of a gas including a fluorine atom and an oxygen atom, for example, hydrofluoroether (HFE) and the like such as HFE-347mcf ($CF_3CF_2CH_2OCHF_2$), HFE-356mec ($CF_3CHFCF_2OCH_3$), HFE-347pc-f ($CHF_2CF_2OCH_2CF_3$), HFE-356mf-c ($CF_3CH_2OCF_2OCH_3$), HFE-458mmzc (($CF_3)_2CHCF_2OCH_3$), HFE-449mcf-c ($CF_3CF_2CH_2OCH_2CHF_2$), HFE-449mec-f ($CF_3CHFCF_2OCH_2CF_3$), HFE-356pcf ($CHF_2CF_2CH_2OCHF_2$), HFE-54-11mec-f ($CF_3CHFCF_2OCH_2CF_3$), HFE-458mecf ($CF_3CHFCF_2CH_2OCHF_2$), HFE-458 pcf-c ($CHF_2CF_2CH_2OCF_2CHF_2$), or HFE-55-10mec-fc ($CF_3CHFCF_2OCH_2CF_2CHF_2$). These gases are alternative gases for chlorofluorocarbon for use against the global warming.

Furthermore, in this embodiment, preferably, an inert gas is mixed into the mixed gas for use in the mold fabrication. With this, the plasma discharge can be further stabilized due to an inert gas effect, so that a mold having a fine concavo-convex pattern with a side face in a highly precise vertical shape or in a highly precise downward tapered shape can be fabricated and provided with high stability.

Moreover, in this embodiment, preferably, a gas including a chlorine atom and at least one of a gas including a bromine atom and a gas including an iodine atom are mixed into the mixed gas for use in the mold fabrication. With this, the effect of a chlorine atom and a bromine atom or an iodine atom can enhance the effect of protecting the side face of the portion to be etched, so that a mold having a fine concavo-convex pattern with a side face in a highly precise vertical shape or in a highly precise downward tapered shape can be provided rapidly and inexpensively. In this condition, $Cl_2$, HCl, $BCl_3$, $ClF_3$, or the like may be used as the gas including chlorine. Also, $Br_2$, HBr, or the like may be used as the gas including bromine, and $I_2$, HI, or the like may be used as the gas including iodine. Or, a gas including a chlorine atom and at least one of a bromine atom and an iodine atom, such as ICl, $ClF_2Br$, $ClF_2I$ or BrCl, may be used. Alternatively, a molecular gas including carbon, fluorine and halogen, such as $CF_xCl_{4-x}$, $CF_xBr_{4-x}$ or $CF_xI_{4-x}$ (wherein x=1 through 3), may be used.

In this manner, according to this embodiment, a mold having a fine concavo-convex pattern etched with high precision can be provided inexpensively, easily and stably. Also, a fine concavo-convex pattern having a side face in any shape, as the cross-sectional shape of the fine concavo-convex pattern, ranging from a shape vertical to the substrate surface to a downward tapered shape (namely, a shape in which the upper base is longer than the lower base in the cross-section of each recess) can be freely formed in the WC alloy or the like.

Furthermore, the dimensional etching limit of the fine concavo-convex pattern obtained in the mold of this embodiment largely depends upon the lithography technique employed for forming the resist pattern, and currently, the substance can be etched by the minimum dimension of approximately 50 nm. Also, the mold of this embodiment can be used in various applications ranging from fabrication of an optical circuit component with a large processing dimension to nano-imprint where the minimum dimension is pursued. Moreover, since the mold of this embodiment has the etched cross-section in a vertical shape or a downward tapered shape free from bowing, a material onto which the concavo-convex pattern is transferred is not clogged up in recesses of the mold. Then, the mold can be easily peeled off after the transfer. Furthermore, in order to increase the use durability of the mold of this embodiment by more definitely preventing the clogging of the mold, the fine concavo-convex surface of the mold of this embodiment is subjected to a surface treatment with a metal, Teflon-coating, a silicon coupling agent or the like. The material used in such a surface treatment is arbitrarily selected in accordance with the material onto which the concavo-convex pattern is transferred by using the mold.

In this embodiment, a WCN layer with a small thickness is formed on the side face of the fine concavo-convex pattern of the mold immediately after the etching. The WCN layer can be removed as appropriate by wet etching or dry etching using no nitrogen.

Although the substance including tungsten and carbon is used as the material of the surface portion of the mold in this embodiment, the same effects as those of this embodiment can be attained even when the substance further includes nitrogen. In other words, the same effects as those of this embodiment can be attained also when a WCN alloy or a WNC alloy is used.

INDUSTRIAL APPLICABILITY

As described so far, the dry etching method of this invention is useful for highly precisely microprocessing a substance including tungsten and carbon such as a WC alloy. Also, the fine structure formation method of this invention is very useful for highly precisely forming a fine pattern in a substance including tungsten and carbon such as a WC alloy. Specifically, as a technique to remarkably increase the preciseness and easiness of processing of a hard metal of a WC alloy or the like, the dry etching method and the fine structure formation method of this invention can pave the way for the use of a WC alloy or the like in the field of MEMS (micro-electro-mechanical systems).

The mold fabrication method of this invention is indispensable for fabricating a mold having a highly precise fine concavo-convex pattern by using, as a mold base material, a substance including tungsten and carbon such as a WC alloy. Also, since the mold of this invention has a structure in which a highly precise fine concavo-convex pattern is provided on a hard metal of a WC alloy or the like, it can be used not only as a mold for fabrication of an optical circuit component or a mold for nano-imprint but also as a highly durable mold having a highly precise fine concavo-convex pattern applicable in any field.

What is claimed is:

1. A dry etching method comprising the step of:
    etching a substance including tungsten and carbon by using plasma generated from a mixed gas of a first gas including chlorine, a second gas including at least one of bromine and iodine, and a third gas including nitrogen, wherein
    the substance is a substrate or a layer made of a tungsten-carbon alloy or a material in which a total composition ratio of tungsten and carbon is 50 atomic % or more,
    a mixing ratio of the second gas to a total flow rate of the first gas and the second gas is set in a range of approximately 10% by volume or higher to approximately 30% by volume or lower, and
    a surface and an inside of the substance is etched, thereby forming in the substance a pattern including a sidewall with a substantially downward tapered shape.

2. The dry etching method of claim 1,
    wherein the gas including nitrogen includes a nitrogen molecule, an ammonia molecule, or a mixture thereof.

3. The dry etching method of claim 1,
    wherein a gas including oxygen is further mixed into the mixed gas.

4. The dry etching method of claim 1,
    wherein an inert gas is further mixed into the mixed gas.

5. The dry etching method of claim 1,
    wherein a gas including hydrogen is further mixed into the mixed gas.

6. The dry etching method of claim 5,
    wherein the gas including hydrogen includes a hydrogen molecule.

7. A fine structure formation method comprising the steps of:
    forming a mask pattern on a substance including tungsten and carbon; and
    dry etching, with the mask pattern used, the substance by using plasma generated from a mixed gas of a first gas including chlorine, a second gas including at least one of bromine and iodine, and a third gas including nitrogen, wherein
    the substance is a substrate or a layer made of a tungsten-carbon alloy or a material in which a total composition ratio of tungsten and carbon is 50 atomic % or more,
    a mixing ratio of the second gas to a total flow rate of the first gas and the second gas is set in a range of approximately 10% by volume or higher to approximately 30% by volume or lower, and
    in the step of dry etching, a surface and an inside of the substance is etched, thereby forming in the substance a pattern including a sidewall with a substantially downward tapered shape.

8. The fine structure formation method of claim 7,
    wherein the gas including nitrogen includes a nitrogen molecule, an ammonia molecule, or a mixture thereof.

9. The fine structure formation method of claim 7,
    wherein a gas including oxygen is further mixed into the mixed gas.

10. The fine structure formation method of claim 7,
    wherein an inert gas is further mixed into the mixed gas.

11. The fine structure formation method of claim 7,
    wherein a gas including hydrogen is further mixed into the mixed gas.

12. The fine structure formation method of claim 11,
    wherein the gas including hydrogen includes a hydrogen molecule.

13. A mold fabrication method comprising the step of:
    dry etching using plasma generated from a mixed gas of a first gas including chlorine, a second gas including at least one of bromine and iodine, and a third gas including nitrogen, a substance including tungsten and carbon, thereby processing the substance to be a mold, wherein
    the substance is a substrate or a layer made of a tungsten-carbon alloy or a material in which a total composition ratio of tungsten and carbon is 50 atomic % or more
    a mixing ratio of the second gas to a total flow rate of the first gas and the second gas is set in a range of approximately 10% by volume or higher to approximately 30% by volume or lower, and
    in the step of processing the substance to be the mold, a surface and an inside of the substance is etched, thereby forming in the substance a pattern including a sidewall with a substantially downward tapered shape.

14. The mold fabrication method of claim 13,
    wherein the gas including nitrogen includes a nitrogen molecule, an ammonia molecule, or a mixture thereof.

15. The mold fabrication method of claim 13,
    wherein a gas including an oxygen is further mixed into the mixed gas.

16. The mold fabrication method of claim 13,
    wherein an inert gas is further mixed into the mixed gas.

17. The mold fabrication method of claim 13,
    wherein a gas including hydrogen is further mixed into the mixed gas.

18. The mold fabrication method of claim 17,
    wherein the gas including hydrogen includes a hydrogen molecule.

* * * * *